(12) United States Patent
Nara et al.

(10) Patent No.: US 12,148,196 B2
(45) Date of Patent: Nov. 19, 2024

(54) SUPPORT INFORMATION GENERATING DEVICE, SUPPORT INFORMATION GENERATING SYSTEM, SUPPORT INFORMATION GENERATING METHOD, AND COMPUTER READABLE RECORDING MEDIUM

(71) Applicant: FURUKAWA ELECTRIC CO., LTD., Tokyo (JP)

(72) Inventors: Kazutaka Nara, Tokyo (JP); Katsuki Suematsu, Tokyo (JP); Junya Hirano, Tokyo (JP); Yusuke Hirakawa, Tokyo (JP); Takuya Kido, Tokyo (JP); Takashi Watanabe, Tokyo (JP); Jun Hori, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 427 days.

(21) Appl. No.: 17/457,167

(22) Filed: Dec. 1, 2021

(65) Prior Publication Data

US 2022/0084309 A1    Mar. 17, 2022

Related U.S. Application Data

(63) Continuation of application No. PCT/JP2020/021805, filed on Jun. 2, 2020.

(30) Foreign Application Priority Data

Jun. 3, 2019 (JP) ................................ 2019-103609

(51) Int. Cl.
*G06T 7/00* (2017.01)
*G06F 16/29* (2019.01)
(Continued)

(52) U.S. Cl.
CPC ............ *G06V 10/764* (2022.01); *G06F 16/29* (2019.01); *G06F 16/55* (2019.01); *G06Q 10/06* (2013.01);
(Continued)

(58) Field of Classification Search
CPC ........... G06K 9/00261; G06K 9/00288; G06K 9/00228; G06K 9/00268; G06K 9/00281;
(Continued)

(56) References Cited

U.S. PATENT DOCUMENTS 6,266,442 B1    7/2001  Laumeyer et al.
10,096,122 B1 * 10/2018 Agrawal .................. G06T 7/90
(Continued)

FOREIGN PATENT DOCUMENTS

JP    2007-96855 A    4/2007
JP    2011-48674 A    3/2011
(Continued)

OTHER PUBLICATIONS

Notice of Reasons for Refusal issued Dec. 13, 2022 in Japanese Patent Application No. 2019-103609 (with English machine translation), 6 pages.
(Continued)

*Primary Examiner* — Quan M Hua
(74) *Attorney, Agent, or Firm* — Oblon, McClelland, Maier & Neustadt, L.L.P.

(57) ABSTRACT

A support information generating device includes a processor configured to: obtain first related information including a plurality of first captured images sequentially captured in chronological order, the plurality of first captured images being associated respectively with first captured position information indicating captured positions at which the first captured images are captured; analyze the plurality of first captured images; recognize a specific facility captured in at
(Continued)

least one first captured image of the plurality of first captured images; determine a classification of the specific facility captured in the first captured image; generate first facility classification information indicating the classification; and generate support information including the first facility classification information and first facility position information associated with each other, the first facility position information indicating a position of the specific facility based on the first captured position information associated with the first captured image in which the specific facility is captured.

11 Claims, 15 Drawing Sheets

(51) Int. Cl.
| | |
|---|---|
| *G06F 16/55* | (2019.01) |
| *G06Q 10/06* | (2023.01) |
| *G06T 7/70* | (2017.01) |
| *G06V 10/764* | (2022.01) |

(52) U.S. Cl.
CPC ...... *G06T 7/70* (2017.01); *G06T 2207/30184* (2013.01)

(58) Field of Classification Search
CPC ......... G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80

See application file for complete search history.

(56) References Cited

U.S. PATENT DOCUMENTS

| | | |
|---|---|---|
| 2001/0036293 A1 | 11/2001 | Laumeyer et al. |
| 2001/0043717 A1 | 11/2001 | Laumeyer et al. |
| 2001/0043718 A1 | 11/2001 | Laumeyer et al. |
| 2003/0016869 A1 | 1/2003 | Laumeyer et al. |
| 2004/0062442 A1 | 4/2004 | Laumeyer et al. |
| 2007/0154067 A1 | 7/2007 | Laumeyer et al. |
| 2016/0232636 A1 | 8/2016 | Wayne et al. |
| 2018/0060986 A1* | 3/2018 | Suzuki ................... G06Q 50/40 |
| 2020/0241549 A1* | 7/2020 | Tsurumi ............... G05D 1/0212 |
| 2020/0265601 A1* | 8/2020 | Uchida ................... G01B 11/02 |

FOREIGN PATENT DOCUMENTS

| | | |
|---|---|---|
| JP | 2017-224935 A | 12/2017 |
| JP | 2017-228249 A | 12/2017 |
| JP | 2018-17102 A | 2/2018 |
| WO | WO 2016/132587 A1 | 8/2016 |

OTHER PUBLICATIONS

Extended European Search Report issued Mar. 28, 2023 in Europe Patent Application No. 20818849.0, 9 pages.
Hienonen et al., "Framework for Machine Vision Based Traffic Sign Inventory", Springer International Publishing AG, 2017, pp. 197-208, XP047415054.
International Search Report issued Sep. 8, 2020 in PCT/JP2020/021805, filed on Jun. 2, 2020, 2 pages.

* cited by examiner

FIG.5

| No. | MANAGE-MENT NUMBER (D101) | MANAGER NAME (D102) | ROUTE NAME (D103) | DISTANCE MARK (D104) | FACILITY POSITION INFORMATION | | UPBOUND OR DOWNBOUND CLASSIFICATION (D108) | FACILITY CLASSIFICATION INFORMATION (D109) | INSPECTION DATE (D110) | INSPECTION COMPANY (D111) | INSPECTOR (D112) | DEGREE OF DAMAGE (D113) |
|---|---|---|---|---|---|---|---|---|---|---|---|---|
| | | | | | LATITUDE (D106) | LONGITUDE (D107) | | | | | | |
| 1 | AAAA | AA | NATIONAL HIGHWAY ROUTE A | ZZZ1 | X1 | Y1 | UPBOUND | SIGN | 2019/1/1 | AA CONSULTANT | AA | I |
| 2 | BBBB | BB | NATIONAL HIGHWAY ROUTE B | ZZZ2 | X2 | Y2 | UPBOUND | LAMP | 2019/1/1 | BB CONSULTANT | BB | I |
| 3 | CCCC | CC | NATIONAL HIGHWAY ROUTE CC | ZZZ3 | X3 | Y3 | UPBOUND | INFORMATION BOARD | 2019/1/1 | CC CONSULTANT | CC | I |

| | FACILITY SPECIFICATIONS | | | | | |
|---|---|---|---|---|---|---|
| ■CLASSIFICATION INFORMATION | | | | | | |
| FACILITY CLASSIFICATION INFORMATION | SIGN | MANAGER | AA | | MANAGEMENT NUMBER | AAAA |
| ■POSITIONAL INFORMATION | | | | | | |
| ROAD CATEGORY | NATIONAL ROAD | ROUTE NAME | NATIONAL HIGHWAY ROUTE A | | UPBOUND OR DOWNBOUND CLASSIFICATION | UPBOUND |
| LOCATION | 1-1-1 AA-TOWN CC-CITY XX-PREFECTURE | | | | DISTANCE MARK | ZZZ1 |
| FACILITY POSITION INFORMATION | LATITUDE | X1 | REMARKS | | | |
| | LONGITUDE | Y1 | | | | |
| ■STRUCTURAL INFORMATION | | | | | | |
| SUPPORT FORM | ROADSIDE TYPE | SURFACE TREATMENT TYPE | PAINT TYPE | | BASE FORM | EMBEDDED TYPE |
| SUPPORT BASE RIB FORM | | CONDITION OF ROAD SURFACE BOUNDARY | | | LAMP TYPE | |
| NUMBER OF SIGNS INSTALLED AND SIGN NUMBER | 1xxx | INSTALLATION FORM OF SIGN PLATE | FIXED TYPE | | PREVENTIVE MEASURES AGAINST FALLING OF SIGN PLATE | NONE |
| ANY MEASURES AGAINST LOOSENING | NONE | MATCHMARK | | | ANY VIBRATION DAMPING DEVICE | NONE |
| MEASURES TO IMPROVE DRAINAGE AT POST BASE | NONE | INSTALLATION DATE | | | | |
| ■INSTALLATION ENVIRONMENT INFORMATION | | | | | | |
| INSTALLATION ENVIRONMENT | | DISTANCE FROM COAST | SECTION WHERE SNOW MELTING AGENT IS SPREAD | | SECTION WHERE WIND IS CONTROLLED | |
| ■INSPECTION INFORMATION | | | | | | |
| TYPE OF INSPECTION | | INSPECTION METHOD | INSPECTION DATE | 2019/1/1 | LAST INSPECTION DATE | |
| INSPECTION COMPANY | AA CONSULTANT | INSPECTOR | AA | | | |
| ■MAP OF SURROUNDING AREA | | | | | | |
|  | | | | | | |
| ■CAPTURED IMAGE | | | | | | |
| 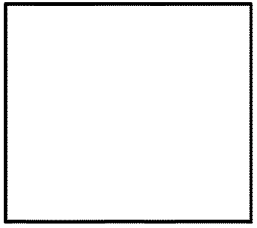 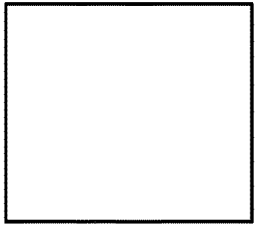 | | | | | | |

| | INSPECTED PART UNIQUE INFORMATION | INSPECTION STARTING TIME | INSPECTION ENDING TIME | TIME STAMP | | | |
|---|---|---|---|---|---|---|---|
| | | | | INSPECTION STARTING TIME | INSPECTION ENDING TIME | INSPECTION STARTING TIME | INSPECTION ENDING TIME |
| INSPECTION-RELATED INFORMATION DA1 | ID1 | ST1 | EN1 | ST1' | EN1' | | |
| INSPECTION-RELATED INFORMATION DA2 | ID2 | ST2 | EN2 | | | | |
| INSPECTION-RELATED INFORMATION DA3 | ID3 | ST3 | EN3 | | | | |
| INSPECTION-RELATED INFORMATION DA4 | ID4 | ST4 | EN4 | | | | |
| INSPECTION-RELATED INFORMATION DA5 | ID5 | ST5 | EN5 | ST5' | EN5' | ST5" | EN5" |
| INSPECTION-RELATED INFORMATION DA6 | ID6 | ST6 | EN6 | | | | |

TB

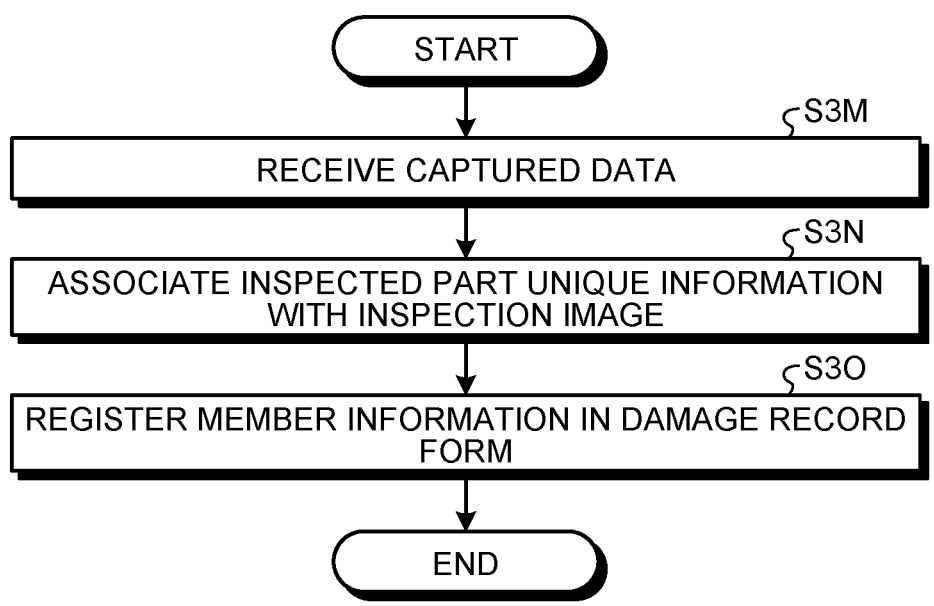

FIG.15

| | INSPECTED PART UNIQUE INFORMATION | INSPECTION IMAGE | | | | | | |
|---|---|---|---|---|---|---|---|---|
| INSPECTION-RELATED INFORMATION DA1 | ID1 | IM1 | IM2 | IM3 | IM4 | IM5 | IM29 | IM30 | IM31 |
| INSPECTION-RELATED INFORMATION DA2 | ID2 | IM6 | IM7 | IM8 | IM9 | IM10 | IM11 | | |
| INSPECTION-RELATED INFORMATION DA3 | ID3 | IM12 | IM13 | IM14 | | | | | |
| INSPECTION-RELATED INFORMATION DA4 | ID4 | IM15 | IM16 | IM17 | IM18 | IM19 | IM20 | | |
| INSPECTION-RELATED INFORMATION DA5 | ID5 | IM21 | IM22 | IM32 | IM33 | IM34 | IM35 | | |
| INSPECTION-RELATED INFORMATION DA6 | ID6 | IM23 | IM24 | IM25 | IM26 | IM27 | IM28 | | |

| FACILITY CLASSIFICATION INFORMATION | SIGN | MANAGER | AA DEVELOPMENT BUREAU | MANAGEMENT NUMBER | AA AA AA AA |

■EVALUATION OF DAMAGE AND MEASURES (INCLUDING EMERGENCY MEASURES)

| MEMBER NAME | SUPPORT BODY | | | | | | | |
|---|---|---|---|---|---|---|---|---|
| | | TYPES OF CHANGES | | | | | | |
| | | STEEL MEMBER | | | | CONCRETE MEMBER | | COMMON |
| | | CRACK | LOOSENING OR FALL-OFF | BREAKAGE | CORROSION | DEFORMATION OR LOSS | CRACK | FLAKING OR PEELING | STAGNANT WATER | OTHERS |
| EVALUATION OF DAMAGE | MEMBER DETERMINATION | | | | | | | | |
| | EVALUATION AT TIME OF INSPECTION | a | | | c | c | | | – | – |
| | EVALUATION AFTER MEASURES | – | | | | – | | | | |
| MEASURES (INCLUDING EMERGENCY MEASURES) | MEASURES IMPLEMENTED | | | | | | | | |
| | UNIMPLEMENTED | REASONS | | | | | | | |
| | | SCHEDULED TIME | | | | | | | |
| | | SCHEDULED MEASURES | | | | | | | |
| SPECIAL NOTES | CORROSION AT LOWER PORTION, END PORTION, AND INNER PORTION OF SUPPORT, AND LOSS OF SUPPORT CAP | | | | | | | | |

FIRST INSPECTION IMAGE

SECOND INSPECTION IMAGE

SUPPORT INFORMATION GENERATING DEVICE, SUPPORT INFORMATION GENERATING SYSTEM, SUPPORT INFORMATION GENERATING METHOD, AND COMPUTER READABLE RECORDING MEDIUM

This application is a continuation of PCT international application Ser. No. PCT/JP2020/021805, filed on Jun. 2, 2020 which designates the United States, incorporated herein by reference, and which claims the benefit of priority from Japanese Patent Applications No. 2019-103609, filed on Jun. 3, 2019, incorporated herein by reference.

BACKGROUND

The present disclosure relates to a support information generating device, a support information generating system, a support information generating method, and a computer readable recording medium.

A system known as an inspection support system for supporting inspection of objects including road appurtenances, such as signs and lamps, captures images of inspected parts and inputs inspection results for the inspected parts using two devices (an image capturing device and an inspection terminal) that are independent from each other (see, for example, Japanese Unexamined Patent Application Publication No. 2017-228249).

Facilities, such as road appurtenances, inspected using the inspection support system described in Japanese Unexamined Patent Application Publication No. 2017-228249 are normally managed using a facility register (support information). This facility register has a list of information for each facility that is managed by a manager of a municipality, for example, and that is within the jurisdiction of the municipality, the information including facility position information (latitude and longitude, for example) indicating the position of the facility, facility classification information indicating the classification (among sign, lamp, or information board, for example) of the facility, and damage information indicating the degree of damage to the facility. That is, the manager is able to know information including the facility to be inspected and the degree of damage to the facility, by referring to the facility register.

The facility register is generally generated as follows.

An operator searches for facilities, such as road appurtenances, within the jurisdiction, by walking within the jurisdiction. Furthermore, when the operator finds any facility, such as a road appurtenance, the operator checks the position of the facility and takes a note of facility position information (latitude and longitude, for example) indicating the position checked and facility classification information (among sign, lamp, and information board, for example) indicating the classification of the facility. The operator then generates a facility register having a list of facility position information and facility classification information for each of all of the facilities found within the jurisdiction. After inspection of the facilities listed in the facility register is performed, the operator additionally registers damage information indicating the degrees of damage to the facilities in the facility register, the damage information being results of the inspection.

SUMMARY

The known method of generating a facility register imposes cumbersome operation on the operator and thus has a problem of not being able to improve the convenience.

There is a need for a support information generating device, a support information generating system, a support information generating method, and a computer readable recording medium that improve the convenience.

According to one aspect of the present disclosure, there is provided a support information generating device including a processor including hardware, the processor being configured to: obtain first related information including a plurality of first captured images sequentially captured in chronological order, the plurality of first captured images being associated respectively with first captured position information indicating captured positions at which the first captured images are captured; analyze the plurality of first captured images; recognize a specific facility captured in at least one first captured image of the plurality of first captured images; determine a classification of the specific facility captured in the first captured image; generate first facility classification information indicating the classification; and generate support information including the first facility classification information and first facility position information associated with each other, the first facility position information indicating a position of the specific facility based on the first captured position information associated with the first captured image in which the specific facility is captured.

According to another aspect of the present disclosure, there is provided a support information generating device including: an imaging sensor configured to sequentially output captured images that have been captured; a processor including hardware, the processor being configured to measure a captured position, generate captured position information indicating the captured position; sequentially analyze the captured images output from the image sensor, recognize a specific facility captured in the captured images, determine a classification of the specific facility captured in the captured images, generate facility classification information indicating the classification, and generate support information including the facility classification information and facility position information associated with each other, the facility position information indicating a position of the specific facility based on the captured position information indicating a captured position of the captured image in which the specific facility is captured.

BRIEF DESCRIPTION OF THE DRAWINGS

FIG. 5 is a diagram illustrating an example of a facility register generated at Step S1E.

FIG. 6 is a diagram illustrating an example of facility specifications generated at Step S1E.

FIG. 12 is a diagram illustrating an example of an inspected part selection screen.

FIG. 13 is a diagram illustrating an example of a table.

FIG. 14 is a flowchart illustrating second operation of the inspection support device.

FIG. 15 is a diagram for explanation of Step S3N.

FIG. 16 is a diagram illustrating an example of a damage record form screen.

DETAILED DESCRIPTION

Modes for implementing the present disclosure (hereinafter, embodiments) will be described below by reference to the drawings. The present disclosure is not limited by the embodiments described below. The same reference sign is assigned to the same portions throughout the drawings.

Figure 1:
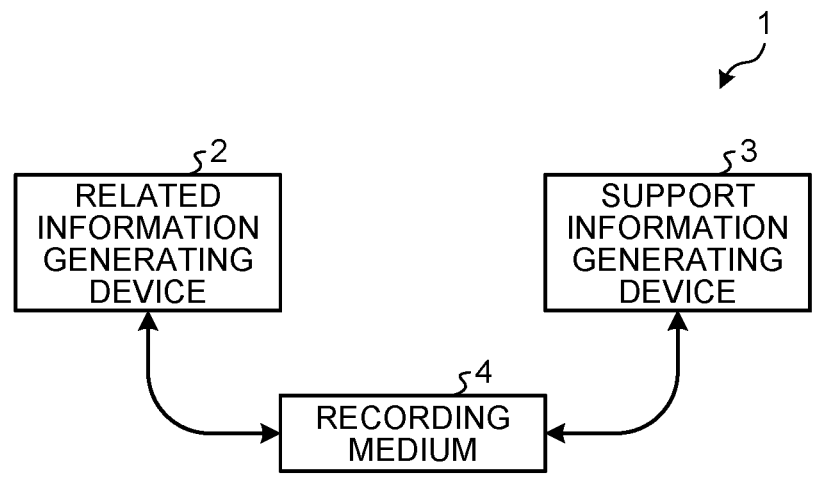
FIG. 1 is a diagram illustrating a support information generating system according to a first embodiment.

FIG. 1 is a diagram illustrating a support information generating system 1 according to a first embodiment.

The support information generating system 1 is a system that generates support information for supporting inspection of road appurtenances (e.g., facilities), such as signs and lamps. Examples of the support information, which will be specifically described later, include facility register data (hereinafter, referred to as a facility register) and facility specification data (hereinafter, referred to as facility specifications).

This support information generating system 1 includes, as illustrated in FIG. 1, a related information generating device 2, a support information generating device 3, and a recording medium 4 that is portable.

The recording medium 4 is a portable recording medium for transferring data between the related information generating device 2 and the support information generating device 3 and is configured to be attachable to and detachable from each of the related information generating device 2 and the support information generating device 3.

Configuration of Related Information Generating Device

Figure 2:
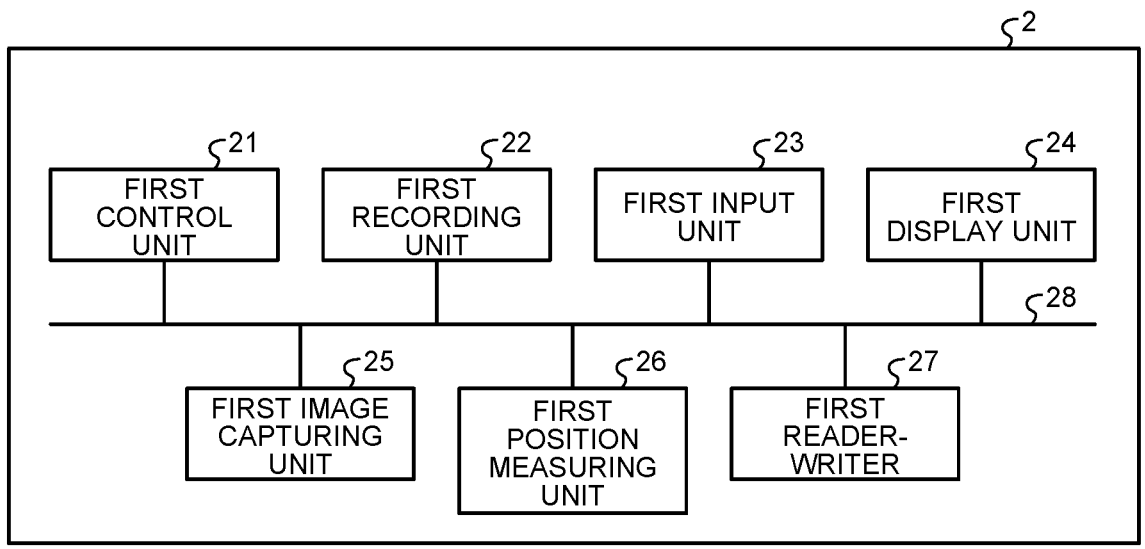
FIG. 2 is a block diagram illustrating a related information generating device.

FIG. 2 is a block diagram illustrating the related information generating device 2.

The related information generating device 2 is formed of a driver recorder to be installed in a vehicle, for example. This related information generating device 2 is configured to include, as illustrated in FIG. 2, a first control unit 21, a first recording unit 22, a first input unit 23, a first display unit 24, a first image capturing unit 25, a first position measuring unit 26, and a first reader-writer 27, and to have these units 21 to 27 connected to one another via a bus 28.

The first control unit 21 is formed of a central processing unit (CPU) or a field-programmable gate array (FPGA), for example, and controls the overall operation of the related information generating device 2 according to a program recorded in the first recording unit 22.

The first recording unit 22 has, recorded therein, the program executed by the first control unit 21, information required for processing by the first control unit 21, and information that has been processed by the first control unit 21, for example.

The first input unit 23 is formed of buttons, switches, or a touch panel for receiving user operations, for example, and outputs operation signals corresponding to the user operations, to the first control unit 21.

The first display unit 24 is formed of a display using liquid crystal or organic electroluminescence (EL), for example, and displays various images, under control of the first control unit 21. A part or all of functions of the first input unit 23 may be provided as a touch panel on a surface of the first display unit 24.

The first image capturing unit 25 is for example an imaging sensor. Specific illustration of the first image capturing unit 25 in the drawings has been omitted but the first image capturing unit 25 includes a lens unit, an imaging element, and a signal processing unit. The lens unit captures a subject image and forms the subject image on an imaging plane of the imaging element. The imaging element is formed of a charge coupled device (CCD) or a complementary metal oxide semiconductor (CMOS), for example, which receives the subject image formed by the lens unit and converts the subject image into an electric signal. The signal processing unit performs signal processing (for example, A/D conversion) on the electric signal from the imaging element and outputs image data (hereinafter, referred to as a captured image).

The first position measuring unit 26 is for example a position measuring unit. This first position measuring unit 26 receives trajectory information transmitted from plural GPS satellites forming a global positioning system (GPS) that is a position measuring means that measures positions of objects on the earth, the trajectory information being on the satellites, and outputs, based on the trajectory information received, captured position information indicating a position (latitude and longitude) of the related information generating device 2 (first image capturing unit 25).

The first control unit 21 generates related information having plural captured images and captured position information (generated by the first position measuring unit 26) in association with each other, the plural captured images having been captured sequentially in chronological order by the first image capturing unit 25, the captured position information indicating captured positions at which the captured images are captured.

The number of pieces of the captured position information generated per unit time by the first position measuring unit 26 is less than the number of captured images generated per unit time (frame rate) by the first image capturing unit 25. Therefore, in a case where captured position information is unable to be generated at the time a captured image is generated, the first control unit 21 generates the captured position information by interpolation and associates the captured image with the captured position information generated by the interpolation. Linear interpolation is supposed herein as this interpolation, but for a curve or the likes for which linear interpolation is not applicable, the data are corrected based on nearby road-shape network data (road links) by assuming that the vehicle has travelled on the road links. Specifically, the first control unit 21 performs the correction based on previous and subsequent positional information obtained by the GPS and driving data (speed per hour and distance, for example).

The first reader-writer 27 records related information generated by the first control unit 21 in the recording medium 4, under control of the first control unit 21, when the recording medium 4 is inserted in the first reader-writer 27.

The related information is information generated based on: plural captured images sequentially captured by the first image capturing unit 25; and captured position information sequentially measured by the first position measuring unit 26, the plural captured images and the captured position information being captured or measured when the related information generating device 2 is installed in a vehicle and the vehicle is travelling on a road.

Figure 3:
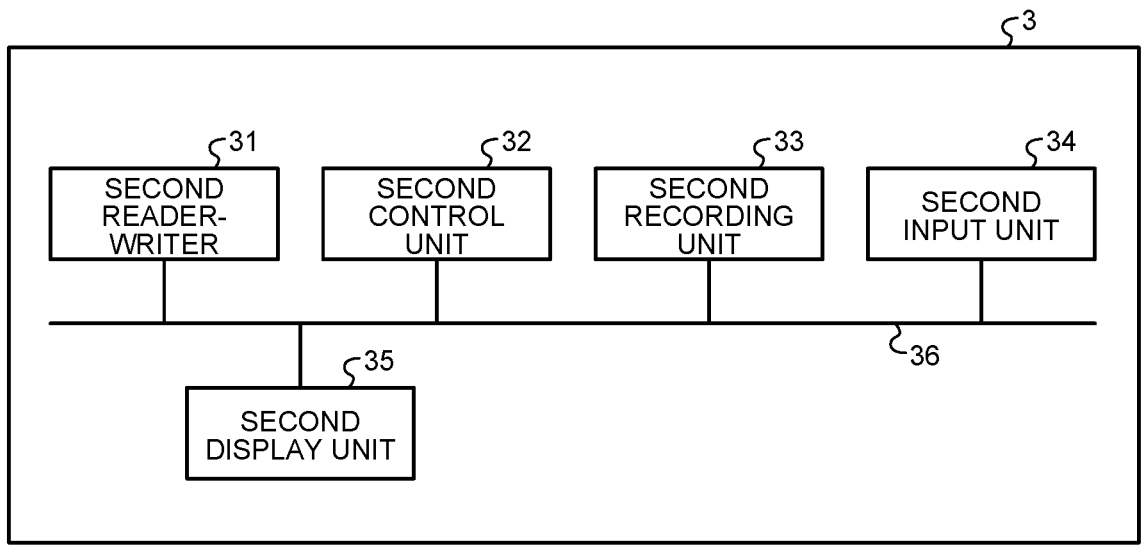
FIG. 3 is a block diagram illustrating a support information generating device.

FIG. 3 is a block diagram illustrating the support information generating device 3.

The support information generating device 3 is formed of a personal computer (PC), for example. This support information generating device 3 is configured to include, as illustrated in FIG. 3, a second reader-writer 31, a second control unit 32, a second recording unit 33, a second input unit 34, and a second display unit 35, and to have these units 31 to 35 connected to one another via a bus 36.

The second reader-writer 31 is for example a related information obtaining unit. This second reader-writer 31 retrieves the related information recorded in the recording medium 4 under control of the second control unit 32 when the recording medium 4 is inserted in the second reader-writer 31. The related information retrieved by the second reader-writer 31 is recorded in the second recording unit 33.

For this first embodiment, the configuration in which the related information is transferred from the related information generating device 2 to the support information generating device 3 by use of the portable recording medium 4 is adopted, but the first embodiment is not limited to this configuration. For example, a configuration in which the related information is transferred from the related information generating device 2 to the support information generating device 3 by use of wireless communication or wired communication may be adopted. In that case, a communication unit that is provided in the support information generating device 3 to perform this communication may be a related information obtaining unit.

The second control unit 32 may be a processor including hardware. This second control unit 32 is formed of a CPU or an FPGA, for example, and controls the overall operation of the support information generating device 3 according to a program recorded in the second recording unit 33 (including a support information generating program according to the present disclosure). The second control unit 32 has functions of an image analyzing unit, a classification determining unit, a position correcting unit, and an information generating unit, according to the present disclosure. Functions of the second control unit 32 will be described in the below.

The second recording unit 33 has, recorded therein, the program executed by the second control unit 32 (e.g., the support information generating program), information required for processing by the second control unit 32, information that has been processed by the second control unit 32, and the related information retrieved by the second reader-writer 31, for example.

Examples of the information required for the processing by the second control unit 32 include map information used in a car navigation device, and a trained model described below. That is, the second recording unit 33 may be a map information recording unit.

The trained model is a model that is provided for each classification of road appurtenances and obtained by machine learning (for example, deep learning) of features of the road appurtenances, the machine learning being based on captured images (training images) having the road appurtenances captured therein. The second control unit 32 is therefore capable of recognizing any road appurtenance (a specific facility according to the present disclosure (for example, any of sign, lamp, and information board, in this first embodiment) captured in at least one captured image of the plural captured images included in the related information, by image recognition using the trained model (image recognition using artificial intelligence (AI)).

The second input unit 34 is formed of buttons, switches, or a touch panel for receiving user operations, for example, and outputs operation signals corresponding to the user operations, to the second control unit 32.

The second display unit 35 is formed of a display using liquid crystal or organic EL, for example, and displays various images under control of the second control unit 32. A part or all of functions of the second input unit 34 may be provided as a touch panel on a surface of the second display unit 35.

Operation (a support information generating method) of the support information generating device 3 described above will be described next.

Figure 4:
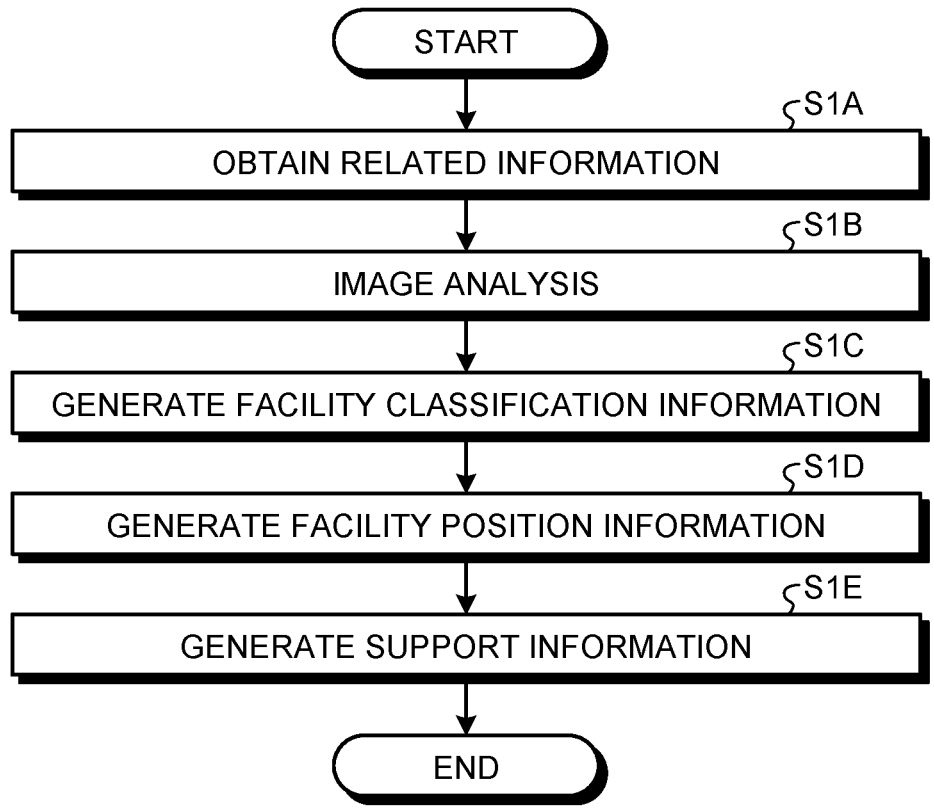
FIG. 4 is a flowchart illustrating a support information generating method.

FIG. 4 is a flowchart illustrating the support information generating method.

It is assumed hereinafter for convenience of explanation that the related information has been generated already by the related information generating device 2 and the recording medium 4 having the related information recorded therein has been inserted in the second reader-writer 31.

Firstly, the second control unit 32 outputs a control signal to the second reader-writer 31, in response to a user operation on the second input unit 34 by an operator to start generation of support information. In response to the control signal, the second reader-writer 31 retrieves the related information recorded in the recording medium 4 (Step S1A). The related information retrieved by the second reader-writer 31 is then recorded in the second recording unit 33.

After Step S1A, the second control unit 32 reads the related information recorded in the second recording unit 33 and analyzes the plural captured images included in the related information (Step S1B). Specifically, the second control unit 32 recognizes any road appurtenance (e.g., a specific facility (for example, any of sign, lamp, and information board in this first embodiment)) captured in at least one captured image of the plural captured images by image recognition using the trained model recorded in the second recording unit 33.

After Step S1B, the second control unit 32 determines the classification (among sign, lamp, and information board, for example) of any road appurtenance recognized at Step S1B and generates facility classification information indicating the classification (Step S1C).

As described later, after Step S1C, the second control unit 32 generates facility position information indicating a position of the road appurtenance, based on captured position information associated with the captured image having the road appurtenance captured therein, the road appurtenance having been recognized at Step S1B (Step S1D).

Specifically, at Step S1D, the second control unit 32 estimates a distance from a captured position to the road appurtenance, based on a size of the road appurtenance recognized at Step S1B, the size being in the captured image, and corrects the captured position based on the distance estimated and generates the facility position information indicating the position of the road appurtenance.

For example, setting is performed beforehand such that a member (hereinafter, referred to as a determination member) that enables determination of a size or length is captured in the captured image. Furthermore, the second control unit 32 refers to the determination member captured, together with the road appurtenance, in the captured image having the road appurtenance captured therein, the road appurtenance having been recognized at Step S1B, and calculates a distance from a position of the first image capturing unit 25 (a position based on the captured position information associated with the captured image having the road appurtenance captured therein, the road appurtenance having been recognized at Step S1B) to the road appurtenance, according to the number of pixels of the determination member, for example. On the basis of the position of the first image capturing unit 25 and the distance calculated, the second control unit 32 then generates the facility position information indicating the position of the road appurtenance.

Furthermore, for example, the second control unit 32 calculates a distance from a position of the first image capturing unit 25 (the position based on the captured position information associated with the captured image having the road appurtenance captured therein, the road appurtenance having been recognized at Step S1B) to the road appurtenance, by comparing the captured image having the road appurtenance captured therein, the captured image having been recognized at Step S1B, and another captured image generated before that captured image by a predetermined time period. On the basis of the position of the first image capturing unit 25 and the distance calculated, the second control unit 32 then generates the facility position information indicating the position of the road appurtenance.

After Step S1D, the second control unit 32 generates support information (a facility register D1 (see FIG. 5) and facility specifications D2 (see FIG. 6)) having the facility classification information generated at Step S1C and the facility position information generated at Step S1D that have been associated with each other (Step S1E). Thereafter, the second control unit 32 ends the flow.

FIG. 5 is a diagram illustrating an example of the facility register D1 generated at Step S1E. FIG. 5 illustrates an example of a case where three road appurtenances different from one another (road appurtenances No. 1 to No. 3) have been recognized at Step S1B from all of the captured images included in the related information.

For example, the facility register D1 generated at Step S1E has, provided therein, as illustrated in FIG. 5, for each of the road appurtenances recognized at Step S1B, entry fields for management number D101, manager name D102, route name D103, distance mark D104, facility position information D105 (latitude D106 and longitude D107), upbound or downbound classification D108 indicating whether the road is upbound or downbound, facility classification information D109, inspection date D110, inspection company D111, inspector D112, and degree of damage D113. That is, the facility register D11 has a list of these items D101 to D113 for each of the road appurtenances.

The second control unit 32 registers, in an entry field for facility position information D105 (latitude D106 and longitude D107), the facility position information generated at Step S1D, based on the captured position information associated with the captured image having the road appurtenance captured therein, the road appurtenance having been recognized at Step S1B. For example, for the road appurtenance No. 1, facility position information (latitude and longitude) generated based on captured position information associated with a captured image having the road appurtenance No. 1 captured therein is a latitude, "X1", and a longitude, "Y1", that have thus been registered respectively in the entry fields for latitude D106 and longitude D107.

Furthermore, the second control unit 32 registers the facility classification information D109 generated at Step S1C in an entry field for facility classification information D109. For example, for the road appurtenance No. 1, facility classification information indicating a classification of the road appurtenance No. 1 is "sign" that has thus been registered in the entry field for facility classification information D109.

Furthermore, based on the facility position information generated at Step S1D and indicating the position of the road appurtenance, the second control unit 32 extracts route name information indicating a route name of a road where the road appurtenance is positioned, distance mark information indicating a distance mark where the road appurtenance is positioned on the road, and upbound or downbound classification information indicating whether the road is upbound or downbound, from the map information recorded in the second recording unit 33. The route name information, the distance mark information, and the upbound or downbound classification information may be correspondence information The second control unit 32 registers the route name information, distance mark information, and upbound or downbound classification information extracted, respectively in entry fields for route name D103, distance mark D104, and upbound or downbound classification D108.

A manager name of a manager who manages the corresponding road appurtenance is registered in an entry field for manager name D102, in response to a user operation (an input operation for a manager name) on the second input unit 34 by an operator, for example.

Furthermore, in entry fields for inspection date D110, inspection company D111, inspector D112, and degree of damage D113, an inspection date, an inspection company, an inspector, and an inspection result for inspection of the corresponding road appurtenance are respectively registered in response to user operations (input operations for the inspection date, inspection company, inspector, and degree of damage) on the second input unit 34 by an operator, for example.

A management number unique to the corresponding road appurtenance is registered in an entry field for management number D101, but the unique management number may be generated and registered by the second control unit 32 independently or a configuration in which the unique management number is registered in response to a user operation (an input operation for the management number) on the second input unit 34 by an operator may be adopted.

FIG. 6 is a diagram illustrating an example of the facility specifications D2 generated at Step S1E.

The facility specifications D2 generated at Step S1E are provided for each of the road appurtenances recognized at Step S1B. That is, because three road appurtenances are included in the facility register D1, three sets of facility specifications D2 corresponding to the facility register D1 illustrated in FIG. 5 are generated. FIG. 6 illustrates only the facility specifications D2 corresponding to the road appurtenance No. 1 included in the facility register D1 illustrated in FIG. 5. For example, this set of facility specifications D2 has, provided therein, as illustrated in FIG. 6, entry fields for classification information D201, positional information D202, structural information D203, installation environment information D204, inspection information D205, map of surrounding area D206, and captured image D207.

The entry field for classification information D201 includes entry fields for information, such as facility classification information on the corresponding road appurtenance, a manager name of a manager of the road appurtenance, and a management number of the road appurtenance.

The second control unit 32 registers the facility classification information generated at Step S1C in the entry field for facility classification information included in the classification information D201. Furthermore, a manager name of a manager who manages the corresponding road appurtenance is registered in the entry field for manager name included in the classification information D201, in response to a user operation (an input operation for the manager name) on the second input unit 34 by an operator, for example. A management number unique to the corresponding road appurtenance is registered in the entry field for management number included in the classification information D201, but the second control unit 32 may independently generate and register the management number, or a configuration in which the management number is registered in response to a user operation (an input operation for the management number) on the second input unit 34 by an operator may be adopted.

The entry field for positional information D202 includes entry fields for information, such as facility position information (latitude and longitude) indicating a position of the corresponding road appurtenance, a road category (national road/major regional road/ . . . ) of a road where the road appurtenance is positioned, a route name of the road, upbound or downbound classification of the road, and a location of the road appurtenance.

The second control unit 32 then registers the facility position information generated at Step S1D in the entry field for facility position information included in the positional information D202. Furthermore, based on the facility position information generated at Step S1D and indicating the position of the road appurtenance, the second control unit 32 extracts road category information indicating a road category of a road where the road appurtenance is positioned, route name information indicating a route name of the road, upbound or downbound classification information indicating whether the road is upbound or downbound, and location information indicating a location (1-1 XX ward XX city XX prefecture, for example) of the road appurtenance, from the map information recorded in the second recording unit 33. The road category information, route name information, upbound or downbound classification information, and location information may be correspondence information. The second control unit 32 then registers the road category information, route name information, upbound or downbound classification information, and location information extracted, in the entry fields for road category, route name, upbound or downbound classification, and location that are included in the positional information D202.

The entry field for structural information D203 includes entry fields for information related to a structure of the corresponding road appurtenance, such as a support form, a surface treatment type, and a support base rib form, of the road appurtenance.

Various types of information are respectively registered in the entry fields for structural information D203 in response to user operations (input operations for the various types of information) on the second input unit 34 by an operator, for example.

The entry field for installation environment information D204 includes entry fields for information related to an installation environment of the corresponding road appurtenance, such as the installation environment for the road appurtenance (general/bridge/tunnel/ . . . ), a distance from the coast, whether or not the road appurtenance is in a section where a snow melting agent is spread, whether or not the road appurtenance is in a section under road traffic control caused by wind, and whether or not the road appurtenance is in a section where measures for protection against snow are implemented.

Various type of information are respectively registered in the entry fields for installation environment information D204 in response to user operations (input operations for the various types of information) on the second input unit 34 by an operator, for example.

The entry field for inspection information D205 includes entry fields for information, such as a type of inspection for the corresponding road appurtenance (initial inspection/regular inspection/extraordinary inspection/ . . . ), an inspection method (close visual inspection/visual appearance inspection/ . . . ), an inspection date, the last inspection date, an inspection company, and an inspector.

Various types of information are respectively registered in the entry fields for inspection information D205 in response to user operations (input operations for the various types of information) on the second input unit 34 by an operator, for example.

Furthermore, based on the facility position information generated at Step S1D and indicating the position of the road appurtenance, the second control unit 32 extracts a map of surrounding area around the road appurtenance from the map information recorded in the second recording unit 33. The map of surrounding area may be correspondence information. The second control unit 32 then registers surrounding area map information in the entry field for map of surrounding area D206, the surrounding area map information having the position of the road appurtenance marked on the map of surrounding area extracted.

Furthermore, the second control unit 32 registers the captured image or images having the road appurtenance captured therein, the road appurtenance having been recognized at Step S1B, in the entry field for captured images D207.

For actual inspection of a road appurtenance, inspection result form data D3 (hereinafter, referred to as an inspection result form D3 (see FIG. 10)) generated based on the facility specifications D2 are used, in addition to the facility specifications D2 described above, in an inspection support system 5 (see FIG. 7) described later. On the basis of this inspection result form D3, damage record form data D4 (hereinafter, referred to as a damage record form D4) are generated, of which the details will be described later.

Information on results of the overall inspection of one road appurtenance identified by a management number is registered in the inspection result form D3. If the road appurtenance is a support, the road appurtenance is formed of plural members, such as a support body and a support base. Furthermore, if the members include a support body, plural inspected parts, such as a support main body, a support joint, and a support branch, have each been assigned to the support body. Plural pieces of member unique information that respectively identify the members forming the road appurtenance uniquely and plural pieces of inspected part unique information that respectively identify the plural inspected parts assigned to each of the members uniquely have been registered beforehand in the inspection result form D3. Furthermore, at Step S3H described later, respectively in association with the plural pieces of inspected part unique information, inspection result information is registered in the inspection result form D3, the inspection result information being, for example, information on whether or not the plural inspected parts are targets of inspection (yes/no), inspection statuses of the plural inspected parts (done/not done), evaluation classifications of damage to the plural inspected parts (not damaged/damaged/largely damaged), necessity of measures taken for the plural inspected parts (required/not required), and diagnosis classifications for health of the plural inspected parts (healthy/preventive maintenance stage/early action stage/urgent action stage). In addition, information, such as a diagnosis classification for the overall health of the road appurtenance in light of the diagnoses of health of all of the inspected parts of the road appurtenance, is also registered in the inspection result form D3.

Information (hereinafter, referred to as member information) on each of the members forming a road appurtenance identified by a management number is registered in the damage record form D4. Member unique information on the members has been registered in the member information beforehand. Furthermore, at Step S30 described later, in association with the member unique information, information and inspection images are registered in the member information, the information being, for example, measures taken for the member and an evaluation result for the overall damage to the member in light of evaluation results for damage to the plural inspected parts assigned to the member, the inspection images having the plural inspected parts captured therein, the plural inspected parts having been assigned to the member.

The management number for one road appurtenance, the member unique information on the member forming the road appurtenance, and the inspected part unique information on the inspected parts assigned to the member are information related to one another. For example, inspected part unique information enables derivation of: member unique information on a member including an inspected part based on the inspected part unique information; and a management number of a road appurtenance including the member.

Schematic Configuration of Inspection Support System

The inspection support system 5 will be described next.

Figure 7:
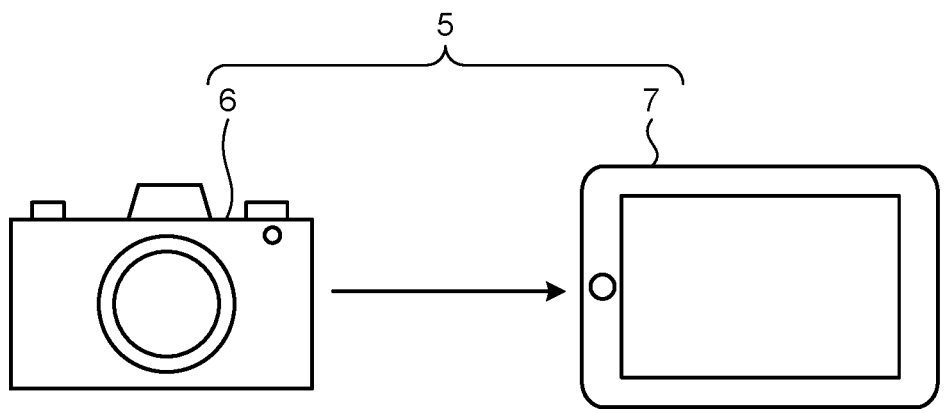
FIG. 7 is a diagram illustrating an inspection support system.

FIG. 7 is a diagram illustrating the inspection support system 5.

The inspection support system 5 is a system that supports inspection of road appurtenances. As illustrated in FIG. 7, in this first embodiment, the inspection support system 5 is a system that captures images of inspected parts and inputs inspection results for the inspected parts by use of two devices, an image capturing device 6 and an inspection support device 7 that are independent from each other. That is, in performing inspection of road appurtenances, an operator performing the inspection includes plural operators that are an operator (hereinafter, referred to as a first operator) who operates the inspection support device 7 and an operator (hereinafter, referred to as a second operator) who operates the image capturing device 6. The first operator and the second operator may be the same person.

Furthermore, in this first embodiment, the inspection support system 5 is configured to include only one image capturing device 6, but without being limited to this configuration, the inspection support system 5 may be configured to include plural image capturing devices 6.

The image capturing device 6 is formed of a digital camera, for example. Functions of the image capturing device 6 will be described in a later section, "Operation of Image Capturing Device".

The inspection support device 7 is formed of, for example, a tablet terminal, a smartphone, a notebook PC (a personal computer), or a wearable device (for example, an eyeglass-type or helmet-type head-mounted display). Functions of the inspection support device 7 will be described in a later section, "Operation of Inspection Support Device".

Operation of the inspection support system 5 described above will be described next. For convenience of explanation, operation of the image capturing device 6 and operation of the inspection support device 7 will be described in order below.

Figure 8:
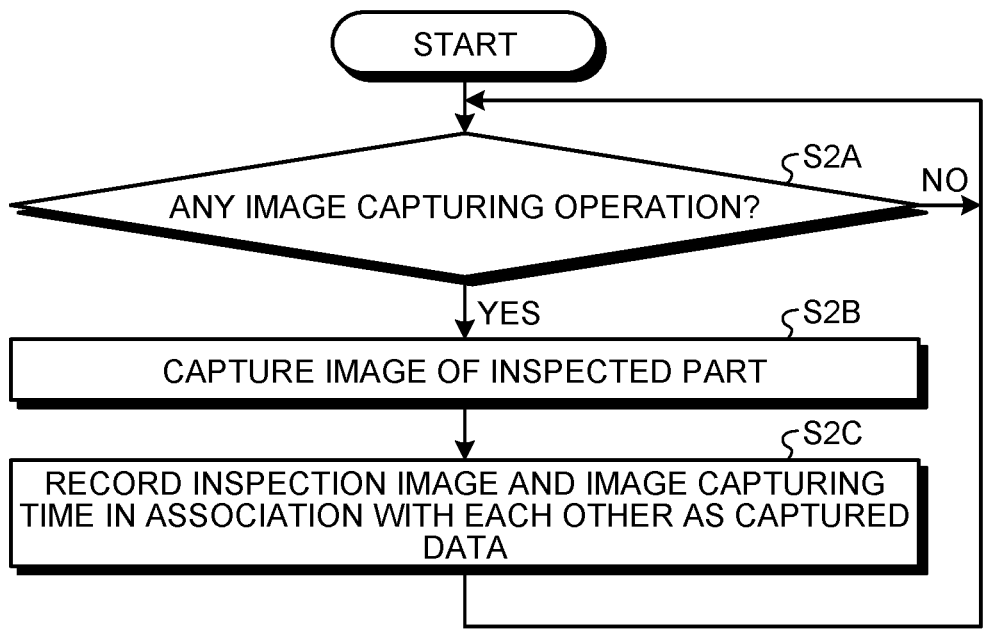
FIG. 8 is a flowchart illustrating operation of an image capturing device.

FIG. 8 is a flowchart illustrating the operation of the image capturing device 6.

The image capturing device 6 constantly monitors whether or not any image capturing operation by the second operator has been performed (Step S2A).

In a case where an image capturing operation has been performed (Step S2A: Yes), the image capturing device 6 captures an image of an inspected part to generate an inspection image (Step S2B). In a case where no image capturing operation has been performed (Step S2A: No), the image capturing device 6 repeats Step S2A.

After Step S2B, the image capturing device 6 records captured data having the inspection image generated at Step S2B and an image capturing time for the inspection image (for example, a time at which the image capturing operation was performed at Step S2A) in association with each other, in a recording unit (not illustrated in the drawings) in the image capturing device 6 (Step S2C). Thereafter, the image capturing device 6 returns to Step S2A.

The operation of the inspection support device 7, the operation including first operation and second operation, will be described in order below.

First Operation of Inspection Support Device

The first operation of the inspection support device 7 will be described first.

Figure 9:
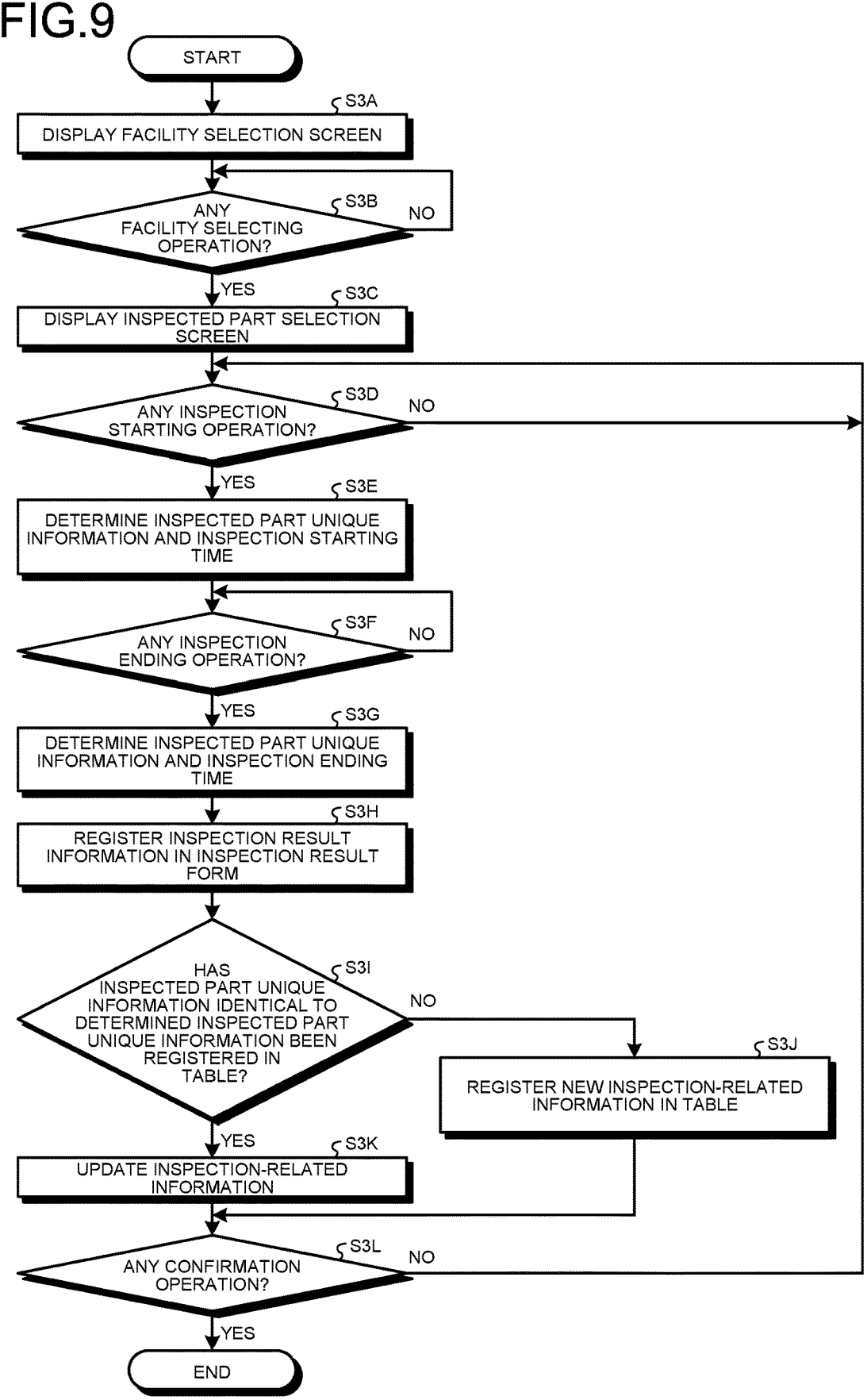
FIG. 9 is a flowchart illustrating first operation of an inspection support device.

FIG. 9 is a flowchart illustrating the first operation of the inspection support device 7.

The inspection support device 7 displays a facility selection screen F1 (see FIG. 11) (Step S3A).

Figure 10:
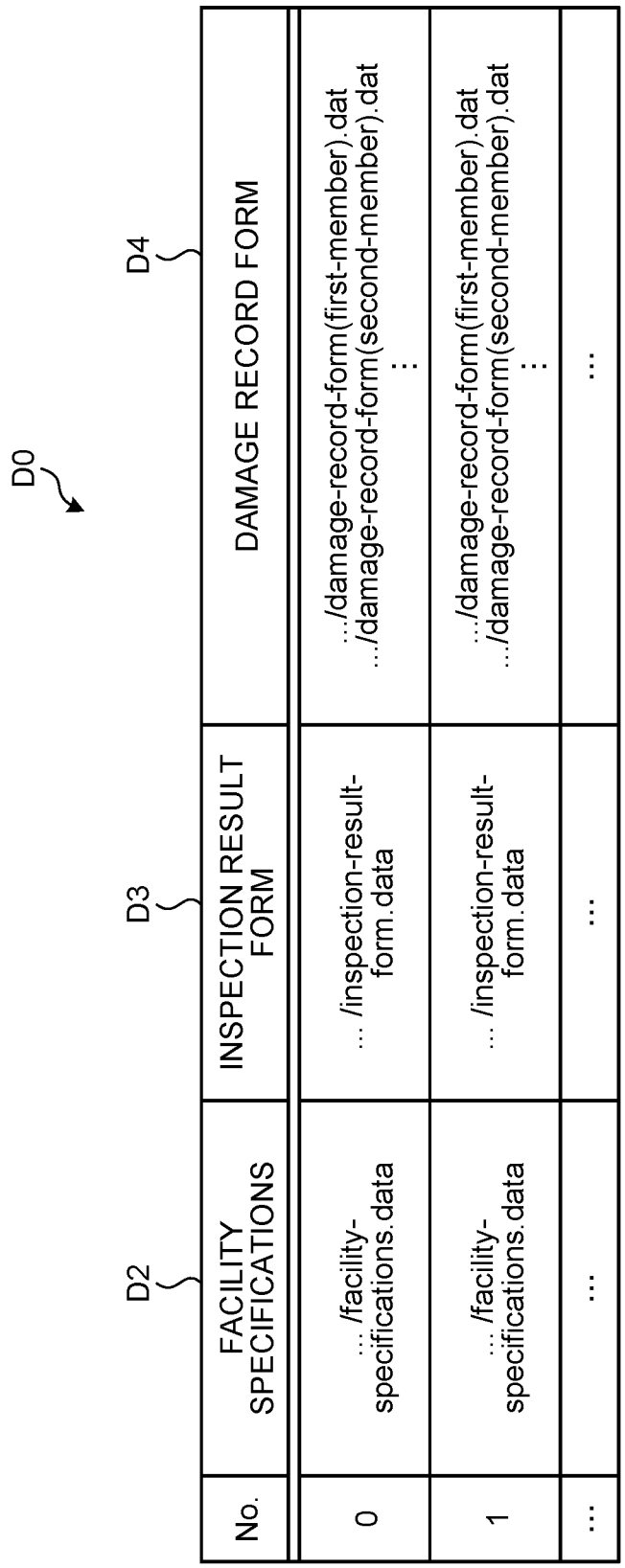
FIG. 10 is a diagram for explanation of Step S3A.
Figure 11:
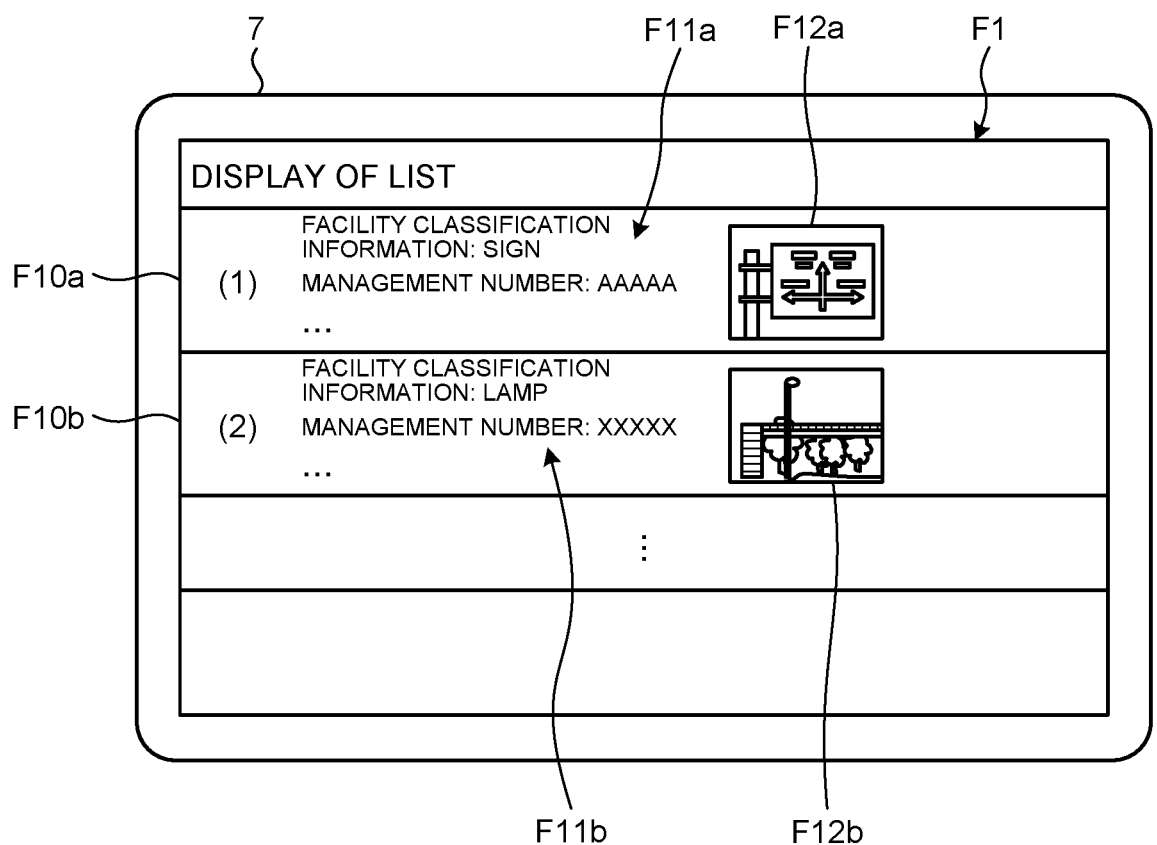
FIG. 11 is a diagram for explanation of Step S3A.

FIG. 10 and FIG. 11 are diagrams for explanation of Step S3A. Specifically, FIG. 10 is a diagram illustrating an example of inspection data D0. FIG. 11 is a diagram illustrating an example of the facility selection screen F1.

The inspection data D0 (FIG. 10) for a road appurtenances to be inspected have been recorded in a recording unit (not illustrated in the drawings) in the inspection support device 7.

In the inspection data D0, as illustrated in FIG. 10, in association with each of all of road appurtenances included in the facility register D1 described above, the facility specifications D2, the inspection result form D3, and the damage record form D4 described above have been registered.

At Step S3A, the inspection support device 7 displays the facility selection screen F1 (FIG. 11) prompting the first operator to select a road appurtenance to be inspected, based on the facility specifications D2 included in the inspection data D0 recorded in the recording unit (not illustrated in the drawings) of the inspection support device 7.

Specifically, the facility selection screen F1 is a screen displaying a list of pieces of road appurtenance information F10a, F10b, . . . that are pieces of information on plural road appurtenances. The pieces of road appurtenance information F10a, F10b, . . . are information having, listed therein, for example, as illustrated in FIG. 11, specification information F11a, F11b, . . . , such as "facility classification information" and "management number" of road appurtenances included in the facility specifications D2 corresponding to the corresponding road appurtenances, and captured images F12a, F12b, . . . (captured images having the road appurtenances recognized at Step S1B captured therein) of the whole road appurtenances included in the facility specifications D2.

By checking the facility selection screen F1 displayed at Step S3A, the first operator is able to perform a facility selecting operation for selecting a road appurtenance to be inspected, on the inspection support device 7. The facility selecting operation is an operation for selecting the piece of road appurtenance information corresponding to the road appurtenance to be inspected, of the plural pieces of road appurtenance information F10a, F10b, . . . that are on the facility selection screen F1.

After Step S3A, the inspection support device 7 constantly monitors whether or not a facility selecting operation has been performed by the first operator (Step S3B).

In a case where a facility selecting operation has been performed (Step S3B: Yes), the inspection support device 7 displays an inspected part selection screen F2 (see FIG. 12) based on the inspection result form D3 corresponding to the road appurtenance selected by the facility selecting operation (Step S3C). The inspected part selection screen F2 is constantly displayed from Step S3C, until the flow (Steps S3A to S3L) is ended. In a case where no facility selecting operation has been performed (Step S3B: No), the inspection support device 7 repeats Step S3B.

Figure 12:
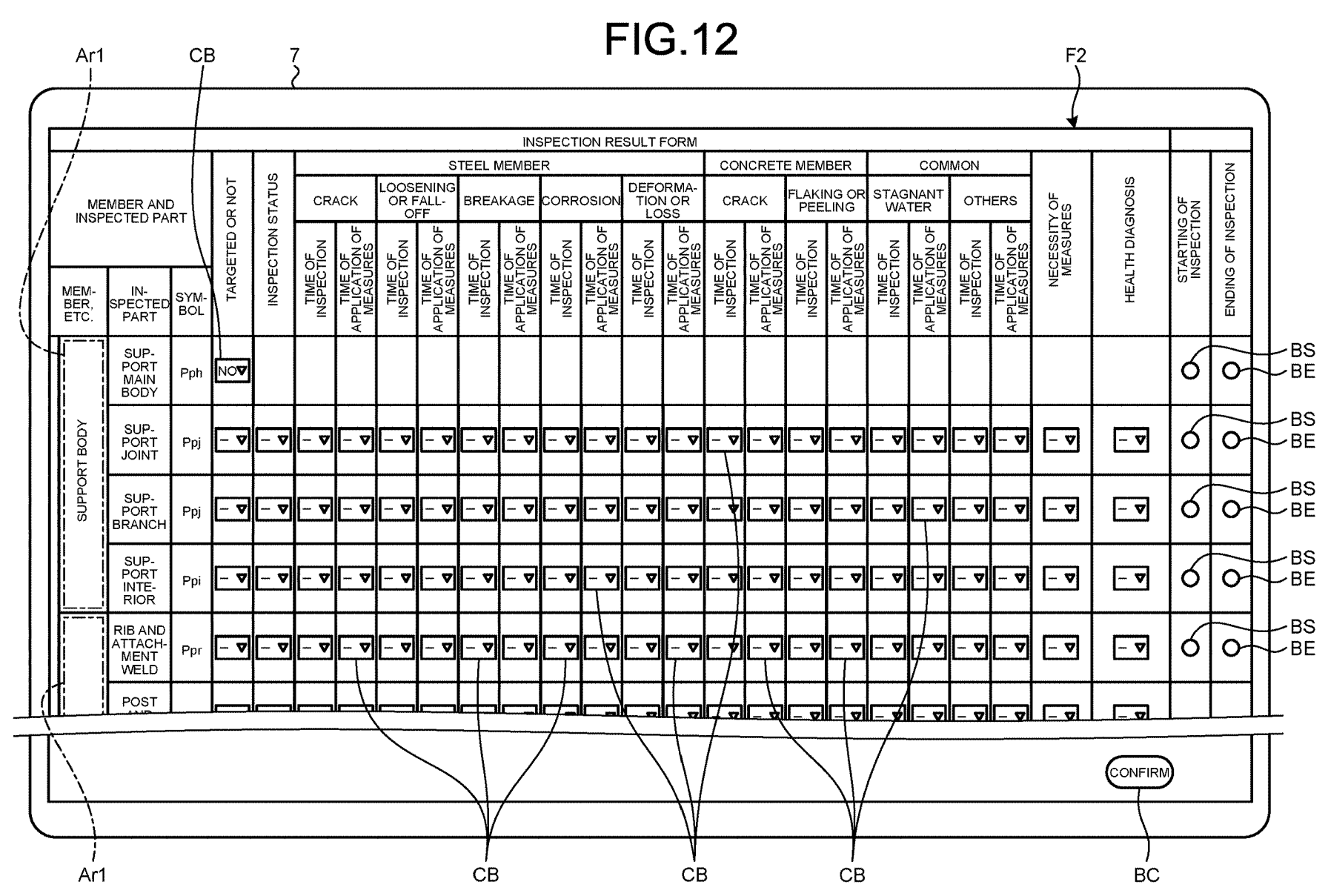

FIG. 12 is a diagram illustrating an example of the inspected part selection screen F2.

Specifically, the inspected part selection screen F2 is, for example, as illustrated in FIG. 12, a screen that has names of all of inspected parts listed for a road appurtenance and is provided with combo boxes CB prompting selection of, for each of all of the inspected parts, each of: whether or not the inspected part is a target of inspection (yes/no); an inspection status (done/not done); an evaluation classification of damage (not damaged/damaged/largely damaged); necessity of measures (required/not required); and a diagnosis classification of health (healthy/preventive maintenance stage/early action stage/urgent action stage).

Furthermore, the inspected part selection screen F2 is provided with, for each of all of the inspected parts, each of an inspection starting button BS for prompting an operation to start inspection of the inspected part and an inspection ending button BE for prompting an operation to end the inspection of the inspected part. The inspection starting button BS and the inspection ending button BE may be formed of the same button (hereinafter, referred to as an inspection button). For that configuration, the inspection support device 7 has a function of counting the number of times the inspection button is selected. On the basis of a count of the number of times of selection, the inspection support device 7 then determines whether an operation to start inspection or an operation to end inspection has been performed.

By checking the inspected part selection screen F2 displayed at Step S3C, the first operator is able to perform, on the inspection support device 7, an inspection starting operation (an operation of selecting the inspection starting button BS corresponding to the inspected part) to start inspection of the inspected part to be inspected, and an inspection ending operation (an operation of selecting the inspection ending button BE corresponding to the inspected part) to end the inspection of the inspected part.

Furthermore, a confirmation button BC prompting selection to end inspection of all of the inspected parts of the road appurtenance is provided on the inspected part selection screen F2.

By checking the inspected part selection screen F2 displayed at Step S3C, the first operator is able to perform a confirmation operation (an operation to select the confirmation button BC) on the inspection support device 7 to end the inspection of all of the inspected parts of the road appurtenance.

After Step S3C, the inspection support device 7 constantly monitors whether or not an inspection start operation has been performed by the first operator (Step S3D).

In a case where an inspection starting operation has been performed (Step S3D: Yes), the inspection support device 7 determines inspected part unique information on an inspected part corresponding to an inspection starting button BS selected by the inspection starting operation and an inspection starting time (for example, a time at which the inspection starting operation was performed at Step S3D) for the inspected part (Step S3E). In a case where no inspection starting operation has been performed (Step S3D: No), the inspection support device 7 repeats Step S3D.

After Step S3E, the inspection support device 7 constantly monitors whether or not an inspection ending operation has been performed by the first operator (Step S3F).

In a case where an inspection ending operation has been performed (Step S3F: Yes), the inspection support device 7 determines inspected part unique information on an inspected part corresponding to an inspection ending button BE selected by the inspection ending operation and an inspection ending time (for example, a time at which the inspection ending operation was performed at Step S3F) for the inspected part (Step S3G). In a case where no inspection ending operation has been performed (Step S3F: No), the inspection support device 7 repeats Step S3F.

After performing an inspection starting operation (Step S3D) corresponding to an inspected part to be inspected, the first operator instructs the second operator to capture an image of the inspected part. After ending capturing of the image of the inspected part, the second operator lets the first operator know that the capturing of the image has ended. After being informed by the second operator that the capturing of the image has ended, the first operator performs an inspection ending operation (Step S3F) corresponding to the inspected part. That is, at Step S2C, an image capturing time within a time period (a time period from Step S3D to Step S3F) from the inspection starting operation to the inspection ending operation corresponding to the inspected part is associated with the inspection image (the inspection image generated at Step S2B) having the inspected part captured therein.

Furthermore, in the time period from the inspection starting operation to the inspection ending operation corresponding to the inspected part to be inspected, while checking the inspected part selection screen F2, the first operator selects each of whether or not the inspected part is a target of inspection, an inspection status, an evaluation classification of damage, necessity of measures, and a diagnosis classification of health, for the inspected part by operating the combo boxes CB. After Step S3G, the inspection support device 7 registers inspection result information including whether or not the inspected part is a target of inspection, the inspection status, the evaluation classification of damage, the necessity of measures, and the diagnosis classification of health that have been selected, in the inspection result form D3, in association with inspected part unique information identical to the inspected part unique information determined at Steps S3E and S3F (Step S3H). A part or all of the operation of the combo boxes CB may be performed after all of the inspection work has ended. Furthermore, after all of the inspection work has ended, the selections made through the combo boxes CB at the time of inspection may be corrected.

After Step S3H, the inspection support device 7 refers to a table TB recorded in the recording unit (not illustrated in the drawings) of the inspection support device 7 and determines whether or not inspected part unique information identical to the inspected part unique information determined at Steps S3E and S3G has been registered in the table TB (Step S3I).

FIG. 13 is a diagram illustrating an example of the table TB.

The table TB (FIG. 13) has been recorded in the recording unit (not illustrated in the drawings) that is in the inspection support device 7.

The table TB is provided for each of all of road appurtenances included in the facility register D1 described above. FIG. 13 illustrates only one of the tables TB, the one corresponding to one of the road appurtenances. For each of plural inspected parts, plural pieces of inspection-related information are registered in the table TB, the inspection-related information having inspected part unique information and time stamps in association with each other, the inspected part unique information being on that inspected part, the time stamps indicating inspection starting times and inspection ending times for the inspected part. In the example of FIG. 13, six first to sixth inspected parts constitute all of inspected parts of one road appurtenance and six pieces of inspection-related information DA1 to DA6 respectively corresponding to the first to sixth inspected parts have been registered in the table TB. Of these six pieces of inspection-related information DA1 to DA6, the pieces of inspection-related information DA1, DA2, and DA5 will be described below.

The inspection-related information DA1 is information having inspected part unique information ID1, time stamps indicating an inspection starting time ST1 and an inspection ending time EN1, and time stamps indicating an inspection starting time ST1' and an inspection ending time EN1', in association with one another.

The inspected part unique information ID1 is the inspected part unique information determined at Steps S3E and S3G executed for the first time with respect to the first inspected part. Furthermore, the time stamps indicating the inspection starting time ST1 and the inspection ending time EN1 are the time stamps determined at Steps S3E and S3G executed for the first time with respect to the first inspected part. In addition, the time stamps indicating the inspection starting time ST1' and the inspection ending time EN1' are the time stamps determined at Steps S3E and S3G executed for the second time with respect to the first inspected part.

The inspection-related information DA2 is information having inspected part unique information ID2 and time stamps, in association with each another, the time stamps indicating an inspection starting time ST2 and an inspection ending time EN2.

The inspected part unique information ID2 is the inspected part unique information determined at Steps S3E and S3G executed for the first time with respect to the second inspected part. Furthermore, the time stamps indicating the inspection starting time ST2 and the inspection ending time EN2 are the time stamps determined at Steps S3E and S3G executed for the first time with respect to the second inspected part. The other pieces of inspection-related information DA3, DA4, and DA6 also have configurations similar to that of the inspection-related information DA2.

The inspection-related information DA5 is information having inspected part unique information ID5, time stamps indicating an inspection starting time ST5 and an inspection ending time EN5, time stamps indicating an inspection starting time ST5' and an inspection ending time EN5', and time stamps indication an inspection starting time ST5" and an inspection ending time EN5", in association with one another.

The inspected part unique information ID5 is the inspected part unique information determined at Steps S3E and S3G executed for the first time with respect to the fifth inspected part. Furthermore, the time stamps indicating the inspection starting time ST5 and the inspection ending time EN5 are the time stamps determined at Steps S3E and S3G executed for the first time with respect to the fifth inspected part. In addition, the time stamps indicating the inspection starting time ST5' and the inspection ending time EN5' are the time stamps determined at Steps S3E and S3G executed for the second time with respect to the fifth inspected part. Furthermore, the time stamps indicating the inspection starting time ST5" and the inspection ending time EN5" are the time stamps determined at Steps S3E and S3G executed for the third time with respect to the fifth inspected part.

Based on the example in FIG. 13, Steps S3J and S3K will be described below.

The following first case will be supposed herein.

The first case is a case where the inspected part unique information ID1, the inspection starting time ST1, and the inspection ending time EN1 have been determined at Steps S3E and S3G executed for the first time with respect to the first inspected part. Furthermore, in the first case, the inspection-related information DA1 has not been registered in the table TB before Steps S3E and S3G for the first time.

In the first case, the inspection support device 7 determines that the inspected part unique information ID1 identical to the inspected part unique information ID1 determined at Steps S3E and S3G for the first time has not been registered in the table TB (Step S3I: No). The inspection support device 7 then registers new inspection-related information DA1 in the table TB by associating the inspected part unique information ID1 determined at Steps S3E and S3G for the first time with the time stamps indicating the inspection starting time ST1 and the inspection ending time EN1 (Step S3J).

Furthermore, the following second case will be supposed herein.

The second case is a case where the inspected part unique information ID1, the inspection starting time ST1', and the inspection ending time EN1' have been determined at Steps S3E and S3G executed for the second time with respect to the first inspected part. That is, in the second case, before Steps S3E and S3G, the inspection-related information DA1 has been registered in the table TB, but the time stamps for the inspection starting time ST1' and inspection ending time EN1' are not included in the inspection-related information DA1.

In the second case, the inspection support device 7 determines that the inspected part unique information ID1 identical to the inspected part unique information ID1 determined at Steps S3E and S3G for the second time has been registered in the table TB (Step S3I: Yes). The inspection support device 7 then updates the inspection-related information DA1 by associating the time stamps indicating the inspection starting time ST1' and inspection ending time EN1' determined at Steps S3E and S3G for the second time with the inspected part unique information ID1 identical to the inspected part unique information ID1 determined at Steps S3E and S3C for the second time (Step S3K).

After Step S3J or Step S3K, the inspection support device 7 determines whether or not a confirmation operation has been performed by the first operator (Step S3L).

In a case where a confirmation operation has not been performed (Step S3L: No), the inspection support device 7 returns to Step S3D. On the contrary, if a confirmation operation has been performed (Step S3L: Yes), the inspection support device 7 ends the flow (first operation).

The second operation of the inspection support device 7 will be described next.

FIG. 14 is a flowchart illustrating the second operation of the inspection support device 7.

The inspection support device 7 establishes connection for communication with the image capturing device 6 and receives the captured data recorded in the recording unit (not illustrated in the drawings) that is in the image capturing device 6 (Step S3M). A configuration in which the second operation is executed after and following the first operation may be adopted, or a configuration in which the second operation is executed independently from the first operation after the first operation may be adopted. In the configuration in which the second operation is executed after and following the first operation, for example, a confirmation operation triggers execution of Step S3M. Furthermore, in the configuration in which the second operation is executed independently from the first operation after the first operation, for example a predetermined operation by a user on the inspection support device 7 triggers execution of Step S3M.

After Step S3M, the inspection support device 7 updates the inspection-related information by associating the inspection images in the captured data received at Step S3M with the inspected part unique information registered in the table TB recorded in the recording unit (not illustrated in the drawings) that is in the inspection support device 7 (Step S3N).

FIG. 15 is a diagram for explanation of Step S3N. Specifically, FIG. 15 is a diagram illustrating an example of the table TB. FIG. 15 is a diagram corresponding to FIG. 13. Furthermore, for convenience of explanation, illustration of the time stamps in the inspection-related information DA1 to DA6 has been omitted in FIG. 15. In addition, in FIG. 15, inspection images IM1 to IM35 have been captured in the order of the inspection images IM1 to IM35. More specifically, the inspection images IM1 to IM5 are inspection images each captured in the time period from the inspection starting time ST1 to the inspection ending time EN1. The inspection images IM6 to IM11 are inspection images each captured in the time period from the inspection starting time ST2 to the inspection ending time EN2. The inspection images IM12 to IM14 are inspection images each captured in the time period from the inspection starting time ST3 to the inspection ending time EN3. The inspection images IM15 to IM20 are inspection images each captured in the time period from the inspection starting time ST4 to the inspection ending time EN4. The inspection images IM21 and IM22 are inspection images each captured in the time period from the inspection starting time ST5 to the inspection ending time ENS. The inspection images IM23 to IM28 are inspection images each captured in the time period from the inspection starting time ST6 to the inspection ending time EN6. The inspection images IM29 to IM31 are inspection images each captured in the time period from the inspection starting time ST1' to the inspection ending time EN1'. The inspection images IM32 to IM33 are inspection images each captured in the time period from the inspection starting time ST5' to the inspection ending time EN5'. The inspection images IM34 and IM35 are inspection images each captured in the time period from the inspection starting time ST5'' to the inspection ending time EN5''.

Step S3N will be described below based on the example in FIG. 15.

The inspection support device 7 checks the time stamps included in the inspection-related information DA1 to DA6 registered in the table TB against the image capturing times included in the captured data received at Step S3M. The inspection support device 7 then updates the inspection-related information by associating the inspection images associated with the image capturing times in the time period from the inspection starting time to the inspection ending time with the inspected part unique information associated with the time stamps indicating the inspection starting time and the inspection ending time. For example, the image capturing times in the time period from the inspection starting time ST1 to the inspection ending time EN1 have been respectively associated with the inspection images IM1 to IM5. Furthermore, the image capturing times in the time period from the inspection starting time ST1' to the inspection ending time EN1' have been respectively associated with the inspection images IM29 to IM31. Therefore, the inspection support device 7 updates the inspection-related information DA1 by associating the inspection images IM1 to IM5 and IM29 to IM31 with the inspected part unique information ID1. Similarly, the inspection support device 7 updates the inspection-related information DA2 by associating the inspection images IM6 to IM11 with the inspected part unique information ID2. The inspection support device 7 also updates the inspection-related information DA3 by associating the inspection images IM12 to IM14 with the inspected part unique information ID3. The inspection support device 7 also updates the inspection-related information DA4 by associating the inspection images IM15 to IM20 with the inspected part unique information ID4. The inspection support device 7 also updates the inspection-related information DA5 by associating the inspection images IM2*l*, IM22, and IM32 to IM35 with the inspected part unique information IDS. The inspection support device 7 also updates the inspection-related information DA6 by associating the inspection images IM23 to IM28 with the inspected part unique information ID6.

After Step S3N, the inspection support device 7 registers member information for each member in the damage record form D4 based on the inspection result form D3 having the inspection result information registered therein at Step S3H and the inspection-related information updated at Step S3N (Step S3O). Thereafter, the inspection support device 7 ends the flow (second operation).

Specifically, at Step S3O, when registering member information on a certain member, the inspection support device 7 registers the member information in the damage record form D4 by associating inspection result information and inspection images, with the member unique information, the inspection result information having been registered in the inspection result form D3 and associated with inspected part unique information related to the member unique information on the member, the inspection images having been registered in the table TB and associated with the inspected part unique information related to the member unique information.

The first operator may perform, on the inspection support device 7, a display operation for a damage record form screen. The display operation for a damage record form screen is an operation to select an area Ar1 corresponding to a member desired to be checked, of plural areas Ar1 (FIG. 12) having names of members listed therein on the inspected part selection screen F2. In a case where a display operation for a damage record form screen has been performed by the first operator, the inspection support device 7 displays a damage record form screen F3 (see FIG. 16) based on the damage record form D4 corresponding to a member selected by the display operation.

FIG. 16 is a diagram illustrating an example of the damage record form screen F3.

The damage record form screen F3 has, as illustrated in FIG. 16, for example, listed thereon, information, such as the member name, the evaluation result for the overall damage to the member, and measures taken for the member, and the inspection images having the plural inspected parts captured therein, the plural inspected parts having been assigned to the member.

The first embodiment described above has the following effects.

The second control unit 32 in the support information generating device 3 according to the first embodiment analyzes plural captured images included in related information generated beforehand by the related information generating device 2, and recognizes any road appurtenance captured in at least one captured image of the plural captured images. Furthermore, the second control unit 32 determines a classification of the road appurtenance captured in the captured image and generates facility classification information indicating the classification. The second control unit 32 then generates support information (the facility register D1 and facility specifications D2) having the facility classification information and facility position information associated with each other, the facility position information indicating a position of the road appurtenance, the facility position information corresponding to captured position information associated with the captured image having the road appurtenance captured therein.

As described above, based on the related information generated by the related information generating device 2, the support information generating device 3 is able to generate the support information substantially automatically, and thus without imposing the known cumbersome operation on operators in generating the support information, the support information generating device 3 enables the convenience to be improved.

Furthermore, based on the facility position information corresponding to the captured position information associated with the captured image having the road appurtenance captured therein, the second control unit 32 in the support information generating device 3 according to the first embodiment extracts correspondence information corresponding to the position of the road appurtenance from map information that has been recorded in the second recording unit 33. The second control unit 32 then generates support information having the correspondence information associated with the facility position information.

Therefore, various types of information (the facility classification information, facility position information, and correspondence information, for example) related to the road appurtenance are registered in the support information, and thus management of the road appurtenance is facilitated based on the support information and the convenience is able to be improved even more.

Furthermore, the second control unit 32 in the support information generating device 3 according to the first embodiment generates the facility position information based on the captured position information.

Therefore, as compared to a configuration in which captured position information is registered in support information, positional information (facility position information) higher in accuracy of the position of the road appurtenance is able to be registered in the support information.

A second embodiment will be described next.

In the following description, the same reference sign will be assigned to any component that is the same as that in the first embodiment described above and detailed description of that component will be omitted or simplified.

This second embodiment is different from the first embodiment described above only in that its second control unit 32 having the support information generating function for generating support information (the facility register D1 and facility specifications D2) by the flow in FIG. 4 additionally has a support information updating function for updating the support information generated. This support information updating function will be described in the following section, "Information Updating Method".

Information Updating Method

Figure 17:
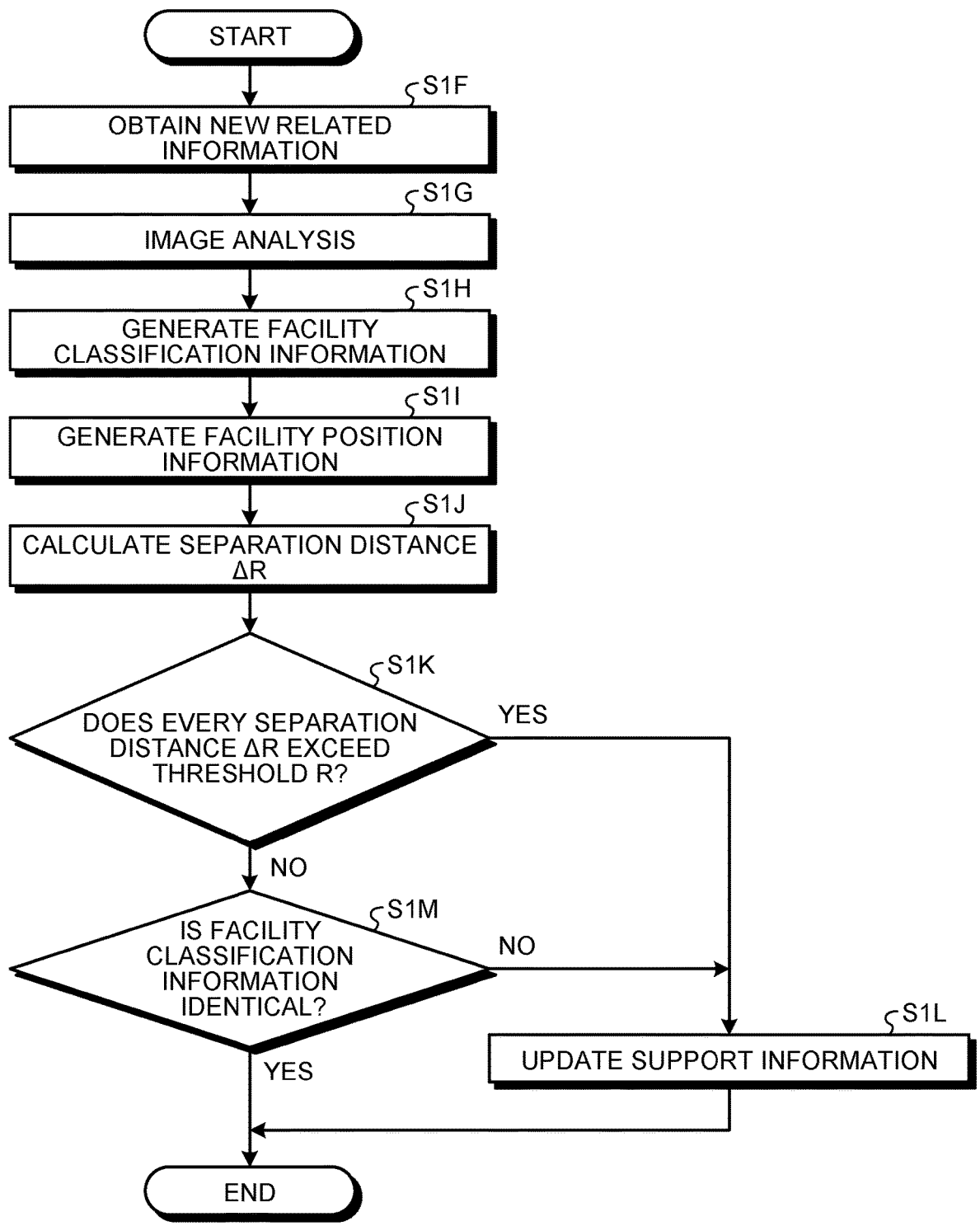
FIG. 17 is a flowchart illustrating an information updating method according to a second embodiment.

FIG. 17 is a flowchart illustrating an information updating method according to the second embodiment.

For convenience of explanation, it is assumed hereinafter that support information (the facility register D1 and facility specifications D2) has been generated already by the flow in FIG. 4 and the support information has been recorded in the second recording unit 33 already. Furthermore, it is also assumed that related information different from the related information obtained at Step S1A at the related information generating device 2 has been newly generated and the recording medium 4 having this new related information recorded therein has been inserted in the second reader-writer 31.

This new related information is plural captured images sequentially captured by the first image capturing unit 25 and information generated based on captured position information sequentially measured by the first position measuring unit 26, when a road where a vehicle was travelling when the related information obtained at Step S1A was generated is being travelled again.

The related information obtained at Step S1A, and the captured images and captured position information that are included in the related information respectively correspond to first related information, first captured images, and first captured position information, according to the present disclosure. Furthermore, the facility classification information and facility position information included in the support information (the facility register D1 and facility specifications D2) generated already by the flow in FIG. 4 respectively correspond to first facility classification information and first facility position information, according to the present disclosure. For convenience of explanation, the facility classification information and facility position information included in the support information generated already by the flow of FIG. 4 will hereinafter be referred to as the first facility classification information and the first facility position information. Furthermore, the new related information and the captured images and captured position information that are included in the new related information respectively correspond to second related information, second captured images, and second captured position information, according to the present disclosure.

Firstly, the second control unit 32 outputs a control signal to the second reader-writer 31, in response to a user operation by an operator on the second input unit 34 to start update of the support information. In response to the control signal, the second reader-writer 31 retrieves the new related information recorded in the recording medium 4 (Step S1F). The new related information retrieved by the second reader-writer 31 is then recorded in the second recording unit 33.

After Step S1F, the second control unit 32 reads the new related information recorded in the second recording unit 33 and analyzes the plural captured images included in the new related information (Step S1G). The method of analyzing the captured images is the same as that described above with respect to Step S1B according to the first embodiment. The second control unit 32 thereby recognizes any road appurtenance captured in at least one captured image of the plural captured images included in the new related information.

After Step S1G, the second control unit 32 determines the classification (among sign, lamp, and information board, for example) of any road appurtenance recognized at Step S1G and generates facility classification information indicating that classification (Step S1H). This facility classification information corresponds to second facility classification information according to the present disclosure. For convenience of explanation, the facility classification information will hereinafter be referred to as the second facility classification information.

After Step S1H, the second control unit 32 generates facility position information indicating a position of the road appurtenance, based on captured position information associated with the captured image having the road appurtenance captured therein (Step S1I), the road appurtenance having been recognized at Step S1G. The method of generating the facility position information is the same as that described above with respect to Step S1D according to the first embodiment. This facility position information corresponds to second facility position information according to the present disclosure. For convenience of explanation, the second facility position information will hereinafter be referred to as the second facility position information.

After Step S1I, the second control unit 32 reads the first facility position information on each of all of the road appurtenances included in the facility register D1 recorded in the second recording unit 33. The second control unit 32 calculates a separation distance ΔR between the position of each of the road appurtenances based on its first facility position information and the position of the road appurtenance (the road appurtenance recognized at Step S1G) based on the second facility position information generated at Step S1I (Step S1J).

After Step S1J, the second control unit 32 determines whether or not all of the separation distances ΔR calculated at Step S1J exceed a predetermined threshold Rj (Step S1K).

In a case where all of the separation distances ΔR have been determined to exceed the threshold Rj (Step S1K: Yes), the second control unit 32 recognizes the road appurtenance recognized at Step S1G as a road appurtenance that has been newly provided on the road. The second control unit 32 then updates the support information recorded in the second recording unit 33 (Step S1L). Thereafter, the second control unit 32 ends the flow.

Specifically, at Step S1L, the second control unit 32 newly registers both the second facility classification information generated at Step S1H and the second facility position information generated at Step S1I, for the road appurtenance newly provided (newly registers as a road appurtenance No. 4, in the example of FIG. 5), for example, in the facility register D1. Furthermore, the second control unit 32 generates the facility specifications D2 corresponding to the road appurtenance newly provided.

On the contrary, in a case where any one of the separation distances ΔR has been determined to be equal to or less than the threshold Rj and not all of the separation distances ΔR have been determined to exceed the threshold Rj (Step S1K: No), the second control unit 32 determines whether or not the first facility classification information associated with the position (first facility position information) of the road appurtenance (hereinafter, referred to as a first road appurtenance) having the separation distance ΔR equal to or less than the threshold Rj from the road appurtenance (hereinafter, referred to as a second road appurtenance) recognized at Step S1G is the same as the second facility classification information generated at Step S1H for the second road appurtenance (Step S1M).

In a case where the first facility classification information has been determined to be the same as the second facility classification information (Step S1M: Yes), the second control unit 32 determines that the second road appurtenance is a road appurtenance (for example, a road appurtenance already provided on the road within the jurisdiction managed by the manager of the municipality, for example) already registered in the facility register D1, and ends the flow.

On the contrary, in a case where the first facility classification information has been determined to be different from the second facility classification information (Step S1M: No), the second control unit 32 recognizes the second road appurtenance as a road appurtenance that has been newly provided in place of the first road appurtenance. The second control unit 32 then proceeds to Step S1L and updates the support information recorded in the second recording unit 33.

Specifically, at Step S1L, the second control unit 32 deletes information related to the first road appurtenance registered in the facility register D1. Furthermore, the second control unit 32 deletes the facility specifications D2 corresponding to the first road appurtenance. The second control unit 32 also newly registers the second facility classification information generated at Step S1H and the second facility position information generated at Step S1I, for the second road appurtenance, for example, in the facility register D1. Furthermore, the second control unit 32 generates the facility specifications D2 corresponding to the second road appurtenance.

The second embodiment described above has the following effects, in addition to effects similar to those of the first embodiment described above.

The second control unit 32 in the support information generating device 3 according to the second embodiment updates support information by the information updating method described above.

Therefore, the support information generating device 3 is capable of readily generating support information for a case where a road appurtenance has been removed or a case where a road appurtenance has been newly installed, and thus enables the convenience to be improved even more.

A third embodiment will be described next.

In the following description, the same reference sign will be assigned to any component that is the same as that in the first embodiment described above and detailed description of that component will be omitted or simplified.

The above described support information generating device 3 according to the first embodiment generates support information based on related information generated beforehand by the related information generating device 2.

In contrast, a support information generating device according to this third embodiment is formed of a drive recorder, for example, that is installed in a vehicle, and generates support information in real time when the vehicle is capturing images of road appurtenances, for example, while travelling on a road or roads within the jurisdiction managed by a manager of a municipality, for example.

Figure 18:
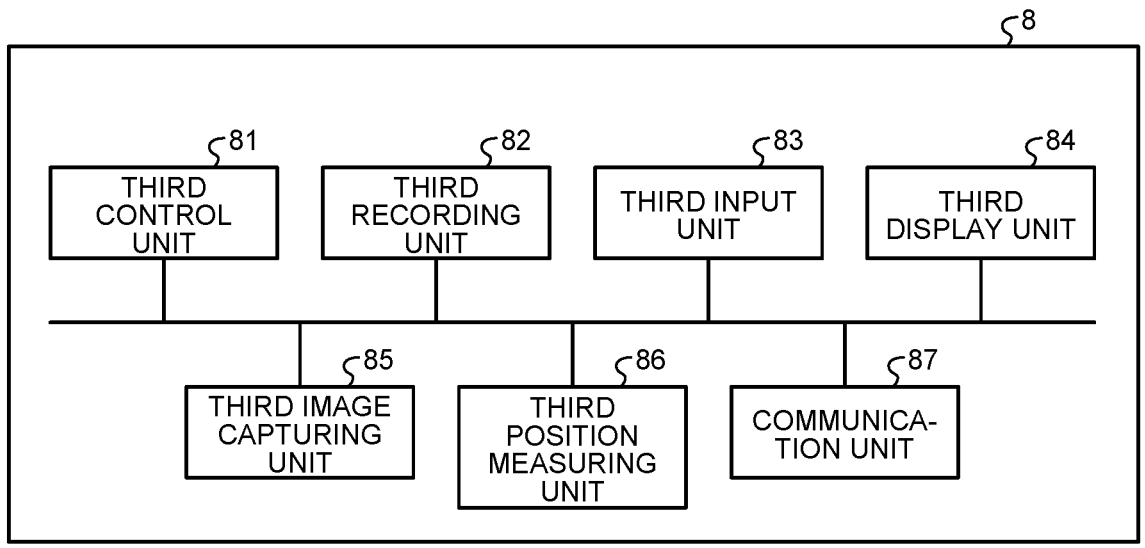
FIG. 18 is a block diagram illustrating a support information generating device according to a third embodiment.

FIG. 18 is a block diagram illustrating a support information generating device 8 according to the third embodiment.

The support information generating device 8 according to the third embodiment includes, as illustrated in FIG. 18, a third control unit 81, a third recording unit 82, a third input unit 83, a third display unit 84, a third image capturing unit 85, a third position measuring unit 86, and a communication unit 87, and these units 81 to 87 are configured to be connected to one another via a bus 88.

The third control unit 81 may be a processor including hardware. This third control unit 81 is formed of a CPU or an FPGA, for example, and controls the overall operation of the support information generating device 8 according to a program (including a support information generating program according to the present disclosure) recorded in the third recording unit 82. The third control unit 81 has functions of an image analyzing unit, a classification determining unit, a position correcting unit, and an information generating unit, according to the present disclosure. Functions of the third control unit 81 will be described in a later section, "Support Information Generating Method".

The third recording unit 82 has, recorded therein, the program (including the support information generating program according to the present disclosure) executed by the third control unit 81, information required for processing by the third control unit 81, and information that has been processed by the third control unit 81 (including captured images generated by the third image capturing unit 85), for example.

Examples of the information required for the processing by the third control unit 81 include the map information and trained model recorded in the second recording unit 33 described above with respect to the first embodiment.

The third input unit 83 is formed of buttons, switches, or a touch panel for receiving user operations, for example, and outputs operation signals corresponding to the user operations, to the third control unit 81.

The third display unit 84 is formed of a display using liquid crystal or organic EL, for example, and displays various images under control of the third control unit 81. A part or all of functions of the third input unit 83 may be provided as a touch panel on a surface of the third display unit 84.

The third image capturing unit 85 may be an image sensor. Specific illustration of the third image capturing unit 85 in the drawings has been omitted but the third image capturing unit 85 includes a lens unit, an imaging element, and a signal processing unit. The lens unit captures a subject image and forms the subject image on an imaging plane of the imaging element. The imaging element is formed of a CCD or a CMOS, for example, that receives the subject image formed by the lens unit and converts the subject image into an electric signal. The signal processing unit performs signal processing (for example, A/D conversion) on the electric signal from the imaging element and outputs image data (hereinafter, referred to as a captured image).

The third position measuring unit 86 may be a position measuring unit. The third position measuring unit 86 receives trajectory information transmitted from plural GPS satellites forming a global positioning system (GPS) that is a position measuring means that measures positions of objects on the earth, the trajectory information being on the satellites, and the third position measuring unit 86 outputs, based on the trajectory information received, captured position information indicating a position (latitude and longitude) of the support information generating device 8 (third image capturing unit 85).

The communication unit 87 performs communication (wireless communication or wired communication) of various data (support information generated, for example) with an external device (not illustrated in the drawings) of the inspection support device 7 described above with respect to the first embodiment, for example, under control of the third control unit 81, according to a predetermined protocol. A configuration in which support information generated is transmitted to an external device by communication is adopted for this third embodiment, but without being limited to this configuration, a configuration in which the support information is transferred to the external device using a portable recording medium like the recording medium 4 described above with respect to the first embodiment may be adopted.

Support Information Generating Method

Operation (a support information generating method) of the support information generating device 8 described above will be described next.

Figure 19:
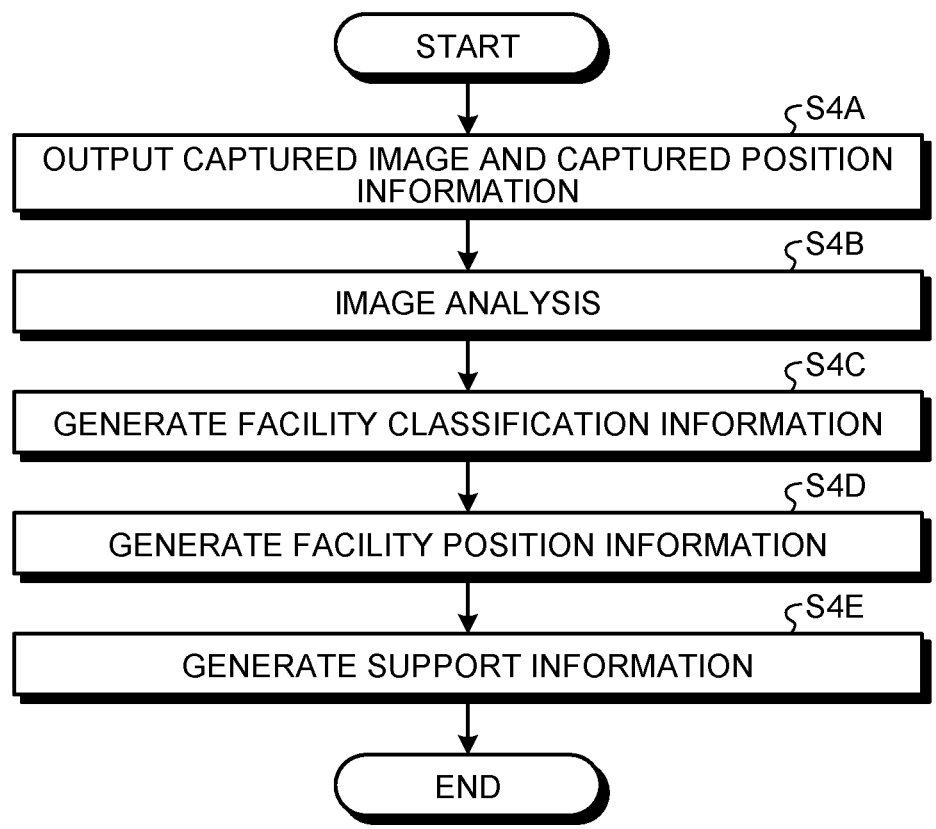
FIG. 19 is a flowchart illustrating a support information generating method.

FIG. 19 is a flowchart illustrating the support information generating method.

It is assumed hereinafter that the support information generating device 8 is installed in a vehicle and the vehicle is travelling on a road within the jurisdiction managed by a manager of a municipality, for example.

Firstly, the third control unit 81 outputs a control signal to each of the third image capturing unit 85 and the third position measuring unit 86, in response to a user operation by an operator on the third input unit 83 to start generation of support information. In response to the control signal, captured images captured are sequentially output from the third image capturing unit 85 and captured position information generated by position measurement is sequentially output from the third position measuring unit 86 in synchronization with the timing of the output of the captured images (Step S4A).

After Step S4A, the third control unit 81 sequentially analyzes the captured images sequentially output from the third image capturing unit 85 (Step S4B). The method of analyzing the captured images is the same as that described above with respect to Step S1B according to the first embodiment. The third control unit 81 thereby recognizes any road appurtenance captured in the captured images.

After Step S4B, the third control unit 81 determines the classification (among sign, lamp, and information board, for example) of any road appurtenance recognized at Step S4B and generates facility classification information indicating the classification (Step S4C).

After Step S4C, the third control unit 81 generates, based on the captured position information output from the third position measuring unit 86 substantially at the same time as the captured image having the road appurtenance captured therein, the road appurtenance having been recognized at Step S4B, facility position information indicating a position of the road appurtenance (Step S4D). The method of generating the facility position information is the same as that described above with respect to Step S1D according to the first embodiment. Furthermore, the number of pieces of captured position information generated per unit time by the third position measuring unit 86 is less than the number of captured images generated per unit time (frame rate) by the third image capturing unit 85. Therefore, in a case where captured position information output from the third position measuring unit 86 substantially at the same time as the captured image in which the road appurtenance recognized at Step S4B is captured is unavailable, the third control unit 81 generates that captured position information by interpolation (for example, linear interpolation).

After Step S4D, the third control unit 81 generates support information (the facility register D1 and facility specifications D2) having the facility classification information generated at Step S4C and the facility position information generated at Step S4D associated with each other, similarly to Step S1E described above with respect to the first embodiment (Step S4E). Thereafter, the third control unit 81 ends the flow.

The support information generating device 8 configured to generate support information in real time while capturing images of road appurtenances, for example, like in the third embodiment described above achieves effects similar to those of the first embodiment described above.

Some modes for implementing the present disclosure have been described thus far, but the present disclosure should not be limited only to the first to third embodiments described above.

According to the above description of the first to third embodiments, examples of facilities according to the present disclosure are road appurtenances, but without being limited to road appurtenances, the facilities may include bridges and tunnels.

Without being limited to the flows in FIG. 4, FIG. 8, FIG. 9, FIG. 14, FIG. 17, and FIG. 19, the order of any of the flows described above with respect to the first to third embodiments may be changed so long as no contradiction is caused by the change.

As described above, a support information generating device, a support information generating system, a support information generating method, and a computer readable recording medium according to the present disclosure are useful for generating support information for supporting inspection of road appurtenances, such as signs and lamps.

A support information generating device, a support information generating system, a support information generating method, and a computer readable recording medium according to the present disclosure improve the convenience.

What is claimed is:

1. A support information generating device comprising a processor comprising hardware, the processor being configured to:
   obtain first related information including a plurality of first captured images sequentially captured in chronological order, the plurality of first captured images being associated respectively with first captured position information indicating captured positions at which the first captured images are captured;
   analyze the plurality of first captured images;
   recognize a specific facility captured in at least one first captured image of the plurality of first captured images;
   determine a classification of the specific facility captured in the first captured image;
   generate first facility classification information indicating the classification; and
   generate support information including the first facility classification information and first facility position information associated with each other, the first facility position information indicating a position of the specific facility based on the first captured position information associated with the first captured image in which the specific facility is captured, wherein the processor is further configured to
   obtain second related information including a plurality of second captured images sequentially captured in chronological order, the plurality of second captured images being associated respectively with second captured position information indicating captured positions at which the second captured images are captured;
   analyze the plurality of second captured images;
   recognize the specific facility captured in at least one second captured image of the plurality of second captured images;
   determine a classification of the specific facility captured in the second captured image; generate second facility classification information indicating the classification;
   make a comparison between: the second facility classification information and second facility position information indicating a position of the specific facility and corresponding to the second captured position information associated with the second captured image in which the specific facility is captured; and the first facility classification information and the first facility position information that are included in the support information; and
   update the support information by replacing the first facility classification information and the first facility position information included in the support information with the second facility classification information and second facility position information in a case where a separation distance between a position based on the first facility position information and a position based on the second facility position information is equal to or less than a predetermined threshold and the first facility classification information associated with the first facility position information is different from the second facility classification information.

2. The support information generating device according to claim 1, wherein in a case where a plurality of the specific facilities different from one another have been recognized by the image analyzing unit, the processor is configured to generate the support information including a list of the first facility classification information and the first facility position information for each of the recognized specific facilities.

3. The support information generating device according to claim 1, wherein in a case where a plurality of the specific facilities different from one another have been recognized, the processor is configured to generate the support information for each of the recognized specific facilities.

4. The support information generating device according to claim 1, further comprising a memory configured to record map information, wherein
   the processor is configured to
     extract, from the map information, correspondence information corresponding to the position of the specific facility based on the first facility position information corresponding to the first captured position information associated with the first captured image in which the specific facility is captured, and
     generate the support information including the first facility position information associated with the correspondence information.

5. The support information generating device according to claim 1, wherein the processor is configured to:
   generate the first facility position information from the first captured position information;
   estimate, based on a size of the recognized specific facility in the first captured image, a distance from the captured position to the specific facility; and
   correct, based on the estimated distance, the captured position to generate the first facility position information.

6. A support information generating device comprising:
   an imaging sensor configured to sequentially output captured images that have been captured;

a processor comprising hardware, the processor being configured to
measure a captured position,
generate captured position information indicating the captured position;
sequentially analyze the captured images output from the image sensor,
recognize a specific facility captured in the captured images,
determine a classification of the specific facility captured in the captured images,
generate facility classification information indicating the classification, and
generate support information including the facility classification information and facility position information associated with each other, the facility position information indicating a position of the specific facility based on the captured position information indicating a captured position of the captured image in which the specific facility is captured,
wherein
the processor is further configured to
make a comparison between: the facility classification information and facility position information generated currently; and the facility classification information and facility position information generated previously; and
update the support information by replacing the previously generated facility classification information and first facility position information included in the support information with the currently generated facility classification information and facility position information in a case where a separation distance between a position based on the previously generated facility position information and a position based on the currently generated facility position information is equal to or less than a predetermined threshold and the previously generated facility classification information associated with the previously generated facility position information is different from the currently generated facility classification information.

7. A support information generating system comprising:
the support information generating device according to claim 1; and
a related information generating device configured to generate the first related information, and the related information generating device including
an image sensor configured to generate the plurality of first captured images, and
a processor comprising hardware, the processor being configured to
measure a position of the image sensor, and
generate the first captured position information indicating the position.

8. A support information generating method comprising:
obtaining first related information including a plurality of first captured images captured sequentially in chronological order, the plurality of first captured images being associated respectively with first captured position information indicating captured positions at which the first captured images are captured;
analyzing the plurality of first captured images and recognizing a specific facility captured in at least one first captured image of the plurality of first captured images;
determining a classification of the specific facility captured in the first captured image and generating first facility classification information indicating the classification;
generating support information including the first facility classification information and first facility position information associated with each other, the first facility position information indicating a position of the specific facility based on the first captured position information associated with the first captured image in which the specific facility is captured;
obtaining second related information including a plurality of second captured images sequentially captured in chronological order, the plurality of second captured images being associated respectively with second captured position information indicating captured positions at which the second captured images are captured;
analyzing the plurality of second captured images and recognizing the specific facility captured in at least one second captured image of the plurality of second captured images;
determining a classification of the specific facility captured in the second captured image and generating second facility classification information indicating the classification;
making a comparison between: the second facility classification information and second facility position information indicating a position of the specific facility and corresponding to the second captured position information associated with the second captured image in which the specific facility is captured; and the first facility classification information and the first facility position information that are included in the support information; and
updating the support information by replacing the first facility classification information and the first facility position information included in the support information with the second facility classification information and second facility position information in a case where a separation distance between a position based on the first facility position information and a position based on the second facility position information is equal to or less than a predetermined threshold and the first facility classification information associated with the first facility position information is different from the second facility classification information.

9. A support information generating method comprising:
sequentially outputting captured images that have been captured by an image sensor;
measuring a position of the image sensor and generating captured position information indicating the position;
sequentially analyzing the captured images output from the image sensor and recognizing a specific facility captured in the captured images;
determining a classification of the specific facility captured in the captured images and generating facility classification information indicating the classification;
generating support information including the facility classification information and facility position information associated with each other, the facility position information indicating a position of the specific facility based on the captured position information indicating a captured position of the captured image in which the specific facility is captured;
making a comparison between: the facility classification information and facility position information generated currently; and the facility classification information and facility position information generated previously; and updating the support information by replacing the previously generated facility classification information and first facility position information included in the support information with the currently generated facility classification information and facility position information in a case where a separation distance between a position based on the previously generated facility position information and a position based on the currently generated facility position information is equal to or less than a predetermined threshold and the previously generated facility classification information associated with the previously generated facility position information is different from the currently generated facility classification information.

10. A non-transitory computer-readable recording medium on which an executable program is recorded, the program causing a processor of a computer to execute:

obtaining related information including a plurality of captured images captured sequentially in chronological order, the plurality of captured images being associated respectively with captured position information indicating captured positions at which the captured images are captured;

analyzing the plurality of captured images and recognizing a specific facility captured in at least one first captured image of the plurality of first captured images;

determining a classification of the specific facility captured in the captured image and generating facility classification information indicating the classification;

generating support information including the facility classification information and facility position information associated with each other, the facility position information indicating a position of the specific facility based on the captured position information associated with the captured image in which the specific facility is captured;

obtaining second related information including a plurality of second captured images sequentially captured in chronological order, the plurality of second captured images being associated respectively with second captured position information indicating captured positions at which the second captured images are captured;

analyzing the plurality of second captured images and recognizing the specific facility captured in at least one second captured image of the plurality of second captured images;

determining a classification of the specific facility captured in the second captured image and generating second facility classification information indicating the classification;

making a comparison between: the second facility classification information and second facility position information indicating a position of the specific facility and corresponding to the second captured position information associated with the second captured image in which the specific facility is captured; and the first facility classification information and the first facility position information that are included in the support information; and updating the support information by replacing the first facility classification information and the first facility position information included in the support information with the second facility classification information and second facility position information in a case where a separation distance between a position based on the first facility position information and a position based on the second facility position information is equal to or less than a predetermined threshold and the first facility classification information associated with the first facility position information is different from the second facility classification information.

11. A non-transitory computer-readable recording medium on which an executable program is recorded, the program causing a processor of a computer to execute:

sequentially outputting captured images that have been captured by an image sensor;

measuring a position of the image sensor and generating captured position information indicating the position;

sequentially analyzing the captured images output from the image sensor and recognizing a specific facility captured in the captured images;

determining a classification of the specific facility captured in the captured images and generating facility classification information indicating the classification;

generating support information including the facility classification information and facility position information associated with each other, the facility position information indicating a position of the specific facility based on the captured position information indicating a captured position of the captured image in which the specific facility is captured;

making a comparison between: the facility classification information and facility position information generated currently; and the facility classification information and facility position information generated previously; and updating the support information by replacing the previously generated facility classification information and first facility position information included in the support information with the currently generated facility classification information and facility position information in a case where a separation distance between a position based on the previously generated facility position information and a position based on the currently generated facility position information is equal to or less than a predetermined threshold and the previously generated facility classification information associated with the previously generated facility position information is different from the currently generated facility classification information.

* * * * *